United States Patent
Chang et al.

(10) Patent No.: US 12,388,980 B2
(45) Date of Patent: Aug. 12, 2025

(54) TEMPLATE SELECTION FOR INTRA PREDICTION IN VIDEO CODING

(71) Applicant: QUALCOMM Incorporated, San Diego, CA (US)

(72) Inventors: Yao-Jen Chang, San Diego, CA (US); Keming Cao, San Diego, CA (US); Vadim Seregin, San Diego, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 117 days.

(21) Appl. No.: 18/338,756

(22) Filed: Jun. 21, 2023

(65) Prior Publication Data

US 2024/0015280 A1    Jan. 11, 2024

Related U.S. Application Data

(60) Provisional application No. 63/377,666, filed on Sep. 29, 2022, provisional application No. 63/367,709, filed on Jul. 5, 2022.

(51) Int. Cl.
  *H04N 19/176*    (2014.01)
  *H04N 19/105*    (2014.01)
  (Continued)

(52) U.S. Cl.
  CPC ......... *H04N 19/105* (2014.11); *H04N 19/132* (2014.11); *H04N 19/176* (2014.11); *H04N 19/186* (2014.11)

(58) Field of Classification Search
  CPC .. H04N 19/105; H04N 19/132; H04N 19/176; H04N 19/186
  (Continued)

(56) References Cited

U.S. PATENT DOCUMENTS 11,647,198 B2    5/2023  Deng et al.
2022/0094940 A1*  3/2022  Bandyopadhyay .. H04N 19/186
(Continued)

FOREIGN PATENT DOCUMENTS

WO    2023009459 A1    2/2023
WO    2023020589 A1    2/2023
(Continued)

OTHER PUBLICATIONS

Deng Z., et al., "Decoder Derived Cross-Component Linear Model Intra-Prediction for Video Coding", 2021 IEEE International Conference on Image Processing (ICIP), IEEE, Sep. 19, 2021, XP034122664, pp. 2034-2038.
(Continued)

*Primary Examiner* — Albert Kir
(74) *Attorney, Agent, or Firm* — Shumaker & Sieffert, P. A.

(57) ABSTRACT

A method of coding video data comprises determining, based on a comparison of a threshold and a quantity of reference samples in a selected template, whether the selected template is allowed, wherein a mode index indicates which template from among a plurality of templates is the selected template, wherein each of the templates includes a different set of reconstructed samples that neighbor a current coding unit (CU) of a current picture of the video data; based on determining that the selected template is allowed and that a convolutional cross-component model (CCCM) mode is to be used, applying the CCCM mode to predict chroma samples of the current CU based on reconstructed luma samples of the current CU and the reference samples in the selected template; and; and encoding or decoding the current CU based on the predicted chroma samples of the current CU.

20 Claims, 16 Drawing Sheets

(51) Int. Cl.
*H04N 19/132* (2014.01)
*H04N 19/186* (2014.01)

(58) Field of Classification Search
USPC .................................................. 375/240.02
See application file for complete search history.

(56) References Cited

U.S. PATENT DOCUMENTS

| | | | | |
|---|---|---|---|---|
| 2022/0248025 | A1* | 8/2022 | Deng | H04N 19/132 |
| 2025/0047884 | A1* | 2/2025 | Hsieh | H04N 19/70 |
| 2025/0106387 | A1* | 3/2025 | Deng | H04N 19/543 |

FOREIGN PATENT DOCUMENTS

| | | | | |
|---|---|---|---|---|
| WO | 2023040968 A1 | 3/2023 | | |
| WO | WO-2023187250 A1 * | 10/2023 | ........... | H04N 19/105 |
| WO | WO-2024002675 A1 * | 1/2024 | | |

OTHER PUBLICATIONS

International Search Report and Written Opinion—PCT/US2023/025995—ISA/EPO—Sep. 14, 2023, 10 pp.
Astola P., et al., "AHG12: Convolutional Cross-Component Model (CCCM) for Intra Prediction", JVET-Z0064-v1, Joint Video Experts Team (JVET) of ITU-T SG 16 WP 3 and ISO/IEC JTC 1/SC 29, 26th Meeting, by Teleconference, Apr. 20-29, 2022, pp. 1-5.
Astola P., et al., "EE2-1.1a: Convolutional Cross-component Intra Prediction Model", JVET-AA0057-v1, Joint Video Experts Team (JVET) of ITU-T SG 16 WP 3 and ISO/IEC JTC 1/SC 29, 27th Meeting, by Teleconference, Jul. 13-22, 2022, pp. 1-4.
Chang Y.J., et al., "EE2-1.13: On CCCM Improvement", JVET-AB0143-v1, Joint Video Experts Team (JVET) of ITU-T SG 16 WP 3 and ISO/IEC JTC 1/SC 29, 28th Meeting, Mainz, DE, Oct. 20-28, 2022, pp. 1-3.
Chang Y.J., et al., "Non-EE2: On CCCM Improvement", JVET-AA0136-v2, Joint Video Experts Team (JVET) of ITU-T SG 16 WP 3 and ISO/IEC JTC 1/SC 29, 27th Meeting, by Teleconference, Jul. 13-22, 2022, pp. 1-3.
Coban M., et al., "Algorithm Description of Enhanced Compression Model 5 (ECM 5)", JVET-Z2025, Joint Video Experts Team (JVET) of ITU-T SG 16 WP 3 and ISO/IEC JTC 1/SC 29, 26th Meeting, by Teleconference, Apr. 20-29, 2022, pp. 1-45.
Coban M., et al., "Algorithm Description of Enhanced Compression Model 6 (ECM 6)", JVET-AA2025, Joint Video Experts Team (JVET) of ITU-T SG 16 WP 3 and ISO/IEC JTC 1/SC 29, 27th Meeting, by teleconference, Jul. 13-22, 2022, Motion Picture Expert Group or ISO/IEC JTC1/SC29/WG11, No. m60618, Oct. 11, 2022, pp. 1-54.
Coban M., et al., "Algorithm Description of Enhanced Compression Model 4 (ECM 4)", JVET-Y2025-v2, Joint Video Experts Team (JVET) of ITU-T SG 16 WP 3 and ISO/IEC JTC 1/SC 29, 23rd Meeting, by teleconference, Jul. 7-16, 2021, pp. 1-32.
ITU-T H.265: "Series H: Audiovisual and Multimedia Systems Infrastructure of Audiovisual Services—Coding of Moving Video", High Efficiency Video Coding, The International Telecommunication Union, Jun. 2019, 696 Pages.
ITU-T H.266: "Series H: Audiovisual and Multimedia Systems Infrastructure of Audiovisual Services—Coding of Moving Video", Versatile Video Coding, The International Telecommunication Union, Aug. 2020, 516 pages.
Karczewicz M., et al., "Common Test Conditions and Evaluation Procedures for Enhanced Compression Tool Testing", JVET-Y2017-v1, Joint Video Experts Team (JVET) of ITU-T SG 16 WP 3 and ISO/IEC JTC 1/SC 29, 25th Meeting, by teleconference, Jan. 12-21, 2022, pp. 1-12.
Lainema J., et al., "EE2-1.1: Slope Adjustment for CCLM", JVET-Z0049-v1, Joint Video Experts Team (JVET) of ITU-T SG 16 WP 3 and ISO/IEC JTC 1/SC 29, 26th Meeting, by Teleconference, Apr. 20-29, 2022, pp. 1-3.
Li X., et al., "EE2-1.2: On Chroma Intra Prediction", JVET-Z0051-v1, Joint Video Experts Team (JVET) of ITU-T SG 16 WP 3 and ISO/IEC JTC 1/SC 29, 26th Meeting, by Teleconference, Apr. 20-29, 2022, pp. 1-6.

* cited by examiner

TEMPLATE SELECTION FOR INTRA PREDICTION IN VIDEO CODING

This application claims the benefit of U.S. Provisional Patent Application 63/377,666, filed Sep. 29, 2022, and U.S. Provisional Patent Application 63/367,709, filed Jul. 5, 2022, the entire content of each of which is incorporated by reference.

TECHNICAL FIELD

This disclosure relates to video encoding and video decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), ITU-T H.265/High Efficiency Video Coding (HEVC), ITU-T H.266/Versatile Video Coding (VVC), and extensions of such standards, as well as proprietary video codecs/formats such as AOMedia Video 1 (AV1) that was developed by the Alliance for Open Media. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video picture or a portion of a video picture) may be partitioned into video blocks, which may also be referred to as coding tree units (CTUs), coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

SUMMARY

In general, this disclosure describes techniques for template selection in video coding. A video coder (e.g., a video encoder or a video decoder) may determine, based on a comparison of a threshold and a quantity of reference samples in a selected template, whether a selected template is allowed. A mode index may indicate which template from among a plurality of templates is the selected template. Each of the templates includes a different set of reconstructed samples that neighbor a current coding unit (CU) of a current picture of video data. Based on determining that the selected template is allowed and that a convolutional cross-component model (CCCM) mode is to be used, apply the CCCM model to predict chroma samples of the current CU based on reconstructed luma samples of the current CU and the reference samples in the selected template. Selecting the template from among a plurality of templates, as opposed to there being only one possible template, may improve coding efficiency, potentially resulting in smaller bitstreams.

In one example, this disclosure describes a method of coding video data, the method comprising: determining, based on a comparison of a threshold and a quantity of reference samples in a selected template, whether the selected template is allowed, wherein a mode index indicates which template from among a plurality of templates is the selected template, wherein each of the templates includes a different set of reconstructed samples that neighbor a current coding unit (CU) of a current picture of the video data; based on determining that the selected template is allowed and that a convolutional cross-component model (CCCM) mode is to be used, applying the CCCM mode to predict chroma samples of the current CU based on reconstructed luma samples of the current CU and the reference samples in the selected template; and encoding or decoding the current CU based on the predicted chroma samples of the current CU.

In another example, this disclosure describes a device for encoding or decoding video data, the device comprising: a memory configured to store the video data; one or more processors implemented in circuitry, the one or more processors configured to: determine, based on a comparison of a threshold and a quantity of reference samples in a selected template, whether the select template is allowed, wherein a mode index indicates which template from among a plurality of templates is the selected template, wherein each of the templates includes a different set of reconstructed samples that neighbor a current coding unit (CU) of a current picture of the video data; based on determining that the selected template is allowed and that a convolutional cross-component model (CCCM) mode is to be used, apply the CCCM mode to predict chroma samples of the current CU based on reconstructed luma samples of the current CU and the reference samples in the selected template; and encode or decode the current CU based on the predicted chroma samples of the current CU.

In another example, this disclosure describes a non-transitory computer-readable storage medium having stored thereon instructions that, when executed, cause one or more processors to: determine, based on a comparison of a threshold and a quantity of reference samples in a selected template, whether the selected template is allowed, wherein a mode index indicates which template from among a plurality of templates is the selected template, wherein each of the templates includes a different set of reconstructed samples that neighbor a current coding unit (CU) of a current picture of video data; based on determining that the selected template is allowed and that a convolutional cross-component model (CCCM) mode is to be used, apply the CCCM mode to predict chroma samples of the current CU based on reconstructed luma samples of the current CU and the reference samples in the selected template; and encode or decode the current CU based on the predicted chroma samples of the current CU In another example, this disclosure describes a device for encoding or decoding video data, the device comprising: means for determining, based on a comparison of a threshold and a quantity of reference samples in a selected template, whether the selected template is allowed, wherein a mode index indicates which template from among a plurality of templates is the selected template, wherein each of the templates includes a different set of reconstructed samples that neighbor a current coding unit (CU) of a current picture of the video data; means for applying, based on determining that the selected template is allowed and that a convolutional cross-component model (CCCM) mode is to be used, the CCCM mode to predict chroma samples of the current CU based on reconstructed luma samples of the current CU and the reference samples in the selected template; and means for encoding or decoding the current CU based on the predicted chroma samples of the current CU.

The details of one or more examples are set forth in the accompanying drawings and the description below. Other features, objects, and advantages will be apparent from the description, drawings, and claims.

DETAILED DESCRIPTION

Video coders may use specific coding tools such as convolutional cross-component model (CCCM) for intra prediction, cross-component linear model with slope adjustment, or chroma fusion for intra prediction in video coding. These coding tools use sets of reconstructed neighboring samples to a current coding unit (CU). However, the sets of reconstructed neighboring samples used in these coding tools is fixed. In other words, these coding tools always use the same set of reconstructed neighboring samples regardless of the location of the current CU within the picture, or whether other sets of reconstructed neighboring samples would lead to better coding efficiency.

In general, this disclosure describes techniques for template selection in video coding. A video coder (e.g., a video encoder or a video decoder) may determine, based on a comparison of a threshold and a quantity of reference samples in a selected template, whether the selected template is allowed, wherein a mode index indicates which template from among a plurality of templates is the selected template. The mode index may be signaled in a bitstream. A video encoder may select the mode index to optimize coding efficiency. Each of the templates includes a different set of reconstructed samples that neighbor a current coding unit (CU) of a current picture of the video data. Based on determining that the selected template is allowed and that a convolutional cross-component model (CCCM) mode is to be used, the video coder may apply the CCCM mode to predict chroma samples of the current CU based on reconstructed luma samples of the current CU and the reference samples in the selected template. In other examples, the video coder may use coding tools other than CCCM, such as cross-component linear model with slope adjustment, or chroma fusion. The ability to select the template from among multiple templates may improve coding efficiency because the different templates may result in different linear models, which may have different accuracy.

Figure 1:
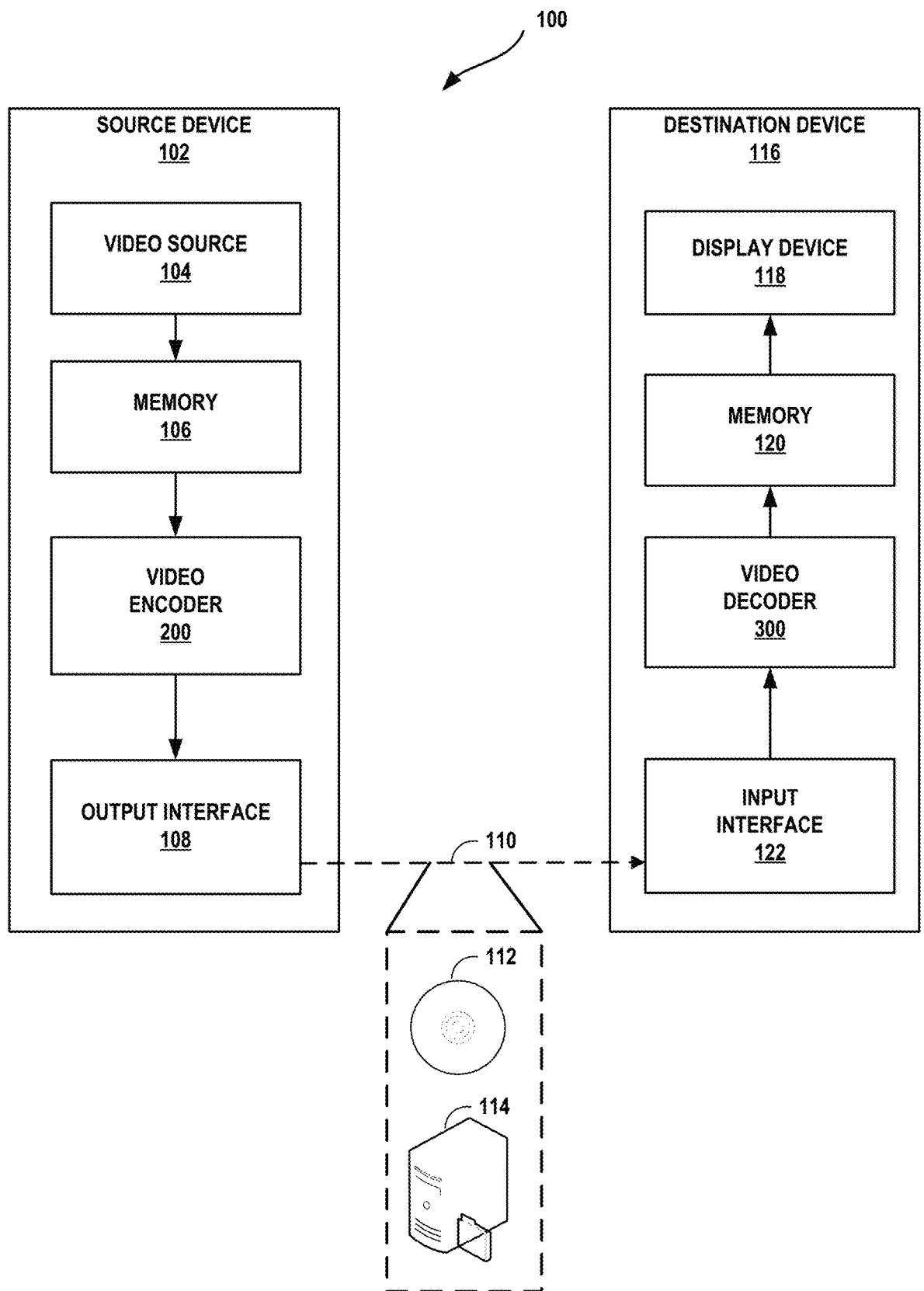
FIG. 1 is a block diagram illustrating an example video encoding and decoding system that may perform the techniques of this disclosure.

FIG. 1 is a block diagram illustrating an example video encoding and decoding system 100 that may perform the techniques of this disclosure. The techniques of this disclosure are generally directed to coding (encoding and/or decoding) video data. In general, video data includes any data for processing a video. Thus, video data may include raw, unencoded video, encoded video, decoded (e.g., reconstructed) video, and video metadata, such as signaling data.

As shown in FIG. 1, system 100 includes a source device 102 that provides encoded video data to be decoded and displayed by a destination device 116, in this example. In particular, source device 102 provides the video data to destination device 116 via a computer-readable medium 110. Source device 102 and destination device 116 may comprise any of a wide range of devices, including desktop computers, notebook (i.e., laptop) computers, mobile devices, tablet computers, set-top boxes, telephone handsets such as smartphones, televisions, cameras, display devices, digital media players, video gaming consoles, video streaming device, broadcast receiver devices, or the like. In some cases, source device 102 and destination device 116 may be equipped for wireless communication, and thus may be referred to as wireless communication devices.

In the example of FIG. 1, source device 102 includes video source 104, memory 106, video encoder 200, and output interface 108. Destination device 116 includes input interface 122, video decoder 300, memory 120, and display device 118. In accordance with this disclosure, video encoder 200 of source device 102 and video decoder 300 of destination device 116 may be configured to apply the techniques for intra prediction in video coding. Thus, source device 102 represents an example of a video encoding device, while destination device 116 represents an example of a video decoding device. In other examples, a source device and a destination device may include other components or arrangements. For example, source device 102 may receive video data from an external video source, such as an external camera. Likewise, destination device 116 may interface with an external display device, rather than include an integrated display device.

System 100 as shown in FIG. 1 is merely one example. In general, any digital video encoding and/or decoding device may perform techniques for intra prediction in video coding. Source device 102 and destination device 116 are merely examples of such coding devices in which source device 102 generates coded video data for transmission to destination device 116. This disclosure refers to a "coding" device as a device that performs coding (encoding and/or decoding) of data. Thus, video encoder 200 and video decoder 300 represent examples of coding devices, in particular, a video encoder and a video decoder, respectively. In some examples, source device 102 and destination device 116 may operate in a substantially symmetrical manner such that each of source device 102 and destination device 116 includes video encoding and decoding components. Hence, system 100 may support one-way or two-way video transmission between source device 102 and destination device 116, e.g., for video streaming, video playback, video broadcasting, or video telephony.

In general, video source 104 represents a source of video data (i.e., raw, unencoded video data) and provides a sequential series of pictures (also referred to as "frames") of the video data to video encoder 200, which encodes data for the pictures. Video source 104 of source device 102 may include a video capture device, such as a video camera, a video archive containing previously captured raw video, and/or a video feed interface to receive video from a video content provider. As a further alternative, video source 104 may generate computer graphics-based data as the source video, or a combination of live video, archived video, and computer-generated video. In each case, video encoder 200 encodes the captured, pre-captured, or computer-generated video data. Video encoder 200 may rearrange the pictures from the received order (sometimes referred to as "display order") into a coding order for coding. Video encoder 200 may generate a bitstream including encoded video data. Source device 102 may then output the encoded video data via output interface 108 onto computer-readable medium 110 for reception and/or retrieval by, e.g., input interface 122 of destination device 116.

Memory 106 of source device 102 and memory 120 of destination device 116 represent general purpose memories. In some examples, memories 106, 120 may store raw video data, e.g., raw video from video source 104 and raw, decoded video data from video decoder 300. Additionally or alternatively, memories 106, 120 may store software instructions executable by, e.g., video encoder 200 and video decoder 300, respectively. Although memory 106 and memory 120 are shown separately from video encoder 200 and video decoder 300 in this example, it should be understood that video encoder 200 and video decoder 300 may also include internal memories for functionally similar or equivalent purposes. Furthermore, memories 106, 120 may store encoded video data, e.g., output from video encoder 200 and input to video decoder 300. In some examples, portions of memories 106, 120 may be allocated as one or more video buffers, e.g., to store raw, decoded, and/or encoded video data.

Computer-readable medium 110 may represent any type of medium or device capable of transporting the encoded video data from source device 102 to destination device 116. In one example, computer-readable medium 110 represents a communication medium to enable source device 102 to transmit encoded video data directly to destination device 116 in real-time, e.g., via a radio frequency network or computer-based network. Output interface 108 may modulate a transmission signal including the encoded video data, and input interface 122 may demodulate the received transmission signal, according to a communication standard, such as a wireless communication protocol. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 102 to destination device 116.

In some examples, source device 102 may output encoded data from output interface 108 to storage device 112. Similarly, destination device 116 may access encoded data from storage device 112 via input interface 122. Storage device 112 may include any of a variety of distributed or locally accessed data storage media such as a hard drive, Blu-ray discs, DVDs, CD-ROMs, flash memory, volatile or non-volatile memory, or any other suitable digital storage media for storing encoded video data.

In some examples, source device 102 may output encoded video data to file server 114 or another intermediate storage device that may store the encoded video data generated by source device 102. Destination device 116 may access stored video data from file server 114 via streaming or download.

File server 114 may be any type of server device capable of storing encoded video data and transmitting that encoded video data to the destination device 116. File server 114 may represent a web server (e.g., for a website), a server configured to provide a file transfer protocol service (such as File Transfer Protocol (FTP) or File Delivery over Unidirectional Transport (FLUTE) protocol), a content delivery network (CDN) device, a hypertext transfer protocol (HTTP) server, a Multimedia Broadcast Multicast Service (MBMS) or Enhanced MBMS (eMBMS) server, and/or a network attached storage (NAS) device. File server 114 may, additionally or alternatively, implement one or more HTTP streaming protocols, such as Dynamic Adaptive Streaming over HTTP (DASH), HTTP Live Streaming (HLS), Real Time Streaming Protocol (RTSP), HTTP Dynamic Streaming, or the like.

Destination device 116 may access encoded video data from file server 114 through any standard data connection, including an Internet connection. This may include a wireless channel (e.g., a Wi-Fi connection), a wired connection (e.g., digital subscriber line (DSL), cable modem, etc.), or a combination of both that is suitable for accessing encoded video data stored on file server 114. Input interface 122 may be configured to operate according to any one or more of the various protocols discussed above for retrieving or receiving media data from file server 114, or other such protocols for retrieving media data.

Output interface 108 and input interface 122 may represent wireless transmitters/receivers, modems, wired networking components (e.g., Ethernet cards), wireless communication components that operate according to any of a variety of IEEE 802.11 standards, or other physical components. In examples where output interface 108 and input interface 122 comprise wireless components, output interface 108 and input interface 122 may be configured to transfer data, such as encoded video data, according to a cellular communication standard, such as 4G, 4G-LTE (Long-Term Evolution), LTE Advanced, 5G, or the like. In some examples where output interface 108 comprises a wireless transmitter, output interface 108 and input interface 122 may be configured to transfer data, such as encoded video data, according to other wireless standards, such as an IEEE 802.11 specification, an IEEE 802.15 specification (e.g., ZigBee™), a Bluetooth™ standard, or the like. In some examples, source device 102 and/or destination device 116 may include respective system-on-a-chip (SoC) devices. For example, source device 102 may include an SoC device to perform the functionality attributed to video encoder 200 and/or output interface 108, and destination device 116 may include an SoC device to perform the functionality attributed to video decoder 300 and/or input interface 122.

The techniques of this disclosure may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications.

Input interface 122 of destination device 116 receives an encoded video bitstream from computer-readable medium 110 (e.g., a communication medium, storage device 112, file server 114, or the like). The encoded video bitstream may include signaling information defined by video encoder 200, which is also used by video decoder 300, such as syntax elements having values that describe characteristics and/or processing of video blocks or other coded units (e.g., slices, pictures, groups of pictures, sequences, or the like). Display device 118 displays decoded pictures of the decoded video data to a user. Display device 118 may represent any of a variety of display devices such as a liquid crystal display (LCD), a plasma display, an organic light emitting diode (OLED) display, or another type of display device.

Although not shown in FIG. 1, in some examples, video encoder 200 and video decoder 300 may each be integrated with an audio encoder and/or audio decoder, and may include appropriate MUX-DEMUX units, or other hardware and/or software, to handle multiplexed streams including both audio and video in a common data stream.

Video encoder 200 and video decoder 300 each may be implemented as any of a variety of suitable encoder and/or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 200 and video decoder 300 may be included in one or more encoders or decoders, either of which may be integrated as part of a combined encoder/decoder (CODEC) in a respective device. A device including video encoder 200 and/or video decoder 300 may comprise an integrated circuit, a microprocessor, and/or a wireless communication device, such as a cellular telephone.

Video encoder 200 and video decoder 300 may operate according to a video coding standard, such as ITU-T H.265, also referred to as High Efficiency Video Coding (HEVC) or extensions thereto, such as the multi-view and/or scalable video coding extensions. Alternatively, video encoder 200 and video decoder 300 may operate according to other proprietary or industry standards, such as ITU-T H.266, also referred to as Versatile Video Coding (VVC). In some examples, video encoder 200 and video decoder 300 may operate according to the Essential Video Coding (EVC) codec. In other examples, video encoder 200 and video decoder 300 may operate according to a proprietary video codec/format, such as AOMedia Video 1 (AV1), extensions of AV1, and/or successor versions of AV1 (e.g., AV2). In other examples, video encoder 200 and video decoder 300 may operate according to other proprietary formats or industry standards. The techniques of this disclosure, however, are not limited to any particular coding standard or format. In general, video encoder 200 and video decoder 300 may be configured to perform the techniques of this disclosure in conjunction with any video coding techniques that use intra prediction in video coding.

In general, video encoder 200 and video decoder 300 may perform block-based coding of pictures. The term "block" generally refers to a structure including data to be processed (e.g., encoded, decoded, or otherwise used in the encoding and/or decoding process). For example, a block may include a two-dimensional matrix of samples of luminance and/or chrominance data. In general, video encoder 200 and video decoder 300 may code video data represented in a YUV (e.g., Y, Cb, Cr) format. That is, rather than coding red, green, and blue (RGB) data for samples of a picture, video encoder 200 and video decoder 300 may code luminance and chrominance components, where the chrominance components may include both red hue and blue hue chrominance components. In some examples, video encoder 200 converts received RGB formatted data to a YUV representation prior to encoding, and video decoder 300 converts the YUV representation to the RGB format. Alternatively, pre- and post-processing units (not shown) may perform these conversions.

This disclosure may generally refer to coding (e.g., encoding and decoding) of pictures to include the process of encoding or decoding data of the picture. Similarly, this disclosure may refer to coding of blocks of a picture to include the process of encoding or decoding data for the blocks, e.g., prediction and/or residual coding. An encoded video bitstream generally includes a series of values for syntax elements representative of coding decisions (e.g., coding modes) and partitioning of pictures into blocks. Thus, references to coding a picture or a block should generally be understood as coding values for syntax elements forming the picture or block.

HEVC defines various blocks, including coding units (CUs), prediction units (PUs), and transform units (TUs). According to HEVC, a video coder (such as video encoder 200) partitions a coding tree unit (CTU) into CUs according to a quadtree structure. That is, the video coder partitions CTUs and CUs into four equal, non-overlapping squares, and each node of the quadtree has either zero or four child nodes. Nodes without child nodes may be referred to as "leaf nodes," and CUs of such leaf nodes may include one or more PUs and/or one or more TUs. The video coder may further partition PUs and TUs. For example, in HEVC, a residual quadtree (RQT) represents partitioning of TUs. In HEVC, PUs represent inter-prediction data, while TUs represent residual data. CUs that are intra-predicted include intra-prediction information, such as an intra-mode indication.

As another example, video encoder 200 and video decoder 300 may be configured to operate according to VVC. According to VVC, a video coder (such as video encoder 200) partitions a picture into a plurality of coding tree units (CTUs). Video encoder 200 may partition a CTU according to a tree structure, such as a quadtree-binary tree (QTBT) structure or Multi-Type Tree (MTT) structure. The QTBT structure removes the concepts of multiple partition types, such as the separation between CUs, PUs, and TUs of HEVC. A QTBT structure includes two levels: a first level partitioned according to quadtree partitioning, and a second level partitioned according to binary tree partitioning. A root node of the QTBT structure corresponds to a CTU. Leaf nodes of the binary trees correspond to coding units (CUs).

In an MTT partitioning structure, blocks may be partitioned using a quadtree (QT) partition, a binary tree (BT) partition, and one or more types of triple tree (TT) (also called ternary tree (TT)) partitions. A triple or ternary tree partition is a partition where a block is split into three sub-blocks. In some examples, a triple or ternary tree partition divides a block into three sub-blocks without dividing the original block through the center. The partitioning types in MTT (e.g., QT, BT, and TT), may be symmetrical or asymmetrical.

When operating according to the AV1 codec, video encoder 200 and video decoder 300 may be configured to code video data in blocks. In AV1, the largest coding block that can be processed is called a superblock. In AV1, a superblock can be either 128×128 luma samples or 64×64 luma samples. However, in successor video coding formats (e.g., AV2), a superblock may be defined by different (e.g., larger) luma sample sizes. In some examples, a superblock is the top level of a block quadtree. Video encoder 200 may further partition a superblock into smaller coding blocks. Video encoder 200 may partition a superblock and other coding blocks into smaller blocks using square or non-square partitioning. Non-square blocks may include N/2×N, N×N/2, N/4×N, and N×N/4 blocks. Video encoder 200 and video decoder 300 may perform separate prediction and transform processes on each of the coding blocks.

AV1 also defines a tile of video data. A tile is a rectangular array of superblocks that may be coded independently of other tiles. That is, video encoder 200 and video decoder 300 may encode and decode, respectively, coding blocks within a tile without using video data from other tiles. However, video encoder 200 and video decoder 300 may perform filtering across tile boundaries. Tiles may be uniform or non-uniform in size. Tile-based coding may enable parallel processing and/or multi-threading for encoder and decoder implementations.

In some examples, video encoder 200 and video decoder 300 may use a single QTBT or MTT structure to represent each of the luminance and chrominance components, while in other examples, video encoder 200 and video decoder 300 may use two or more QTBT or MTT structures, such as one QTBT/MTT structure for the luminance component and another QTBT/MTT structure for both chrominance components (or two QTBT/MTT structures for respective chrominance components).

Video encoder 200 and video decoder 300 may be configured to use quadtree partitioning, QTBT partitioning, MTT partitioning, superblock partitioning, or other partitioning structures.

In some examples, a CTU includes a coding tree block (CTB) of luma samples, two corresponding CTBs of chroma samples of a picture that has three sample arrays, or a CTB of samples of a monochrome picture or a picture that is coded using three separate color planes and syntax structures used to code the samples. A CTB may be an N×N block of samples for some value of N such that the division of a component into CTBs is a partitioning. A component is an array or single sample from one of the three arrays (luma and two chroma) that compose a picture in 4:2:0, 4:2:2, or 4:4:4 color format or the array or a single sample of the array that compose a picture in monochrome format. In some examples, a coding block is an M×N block of samples for some values of M and N such that a division of a CTB into coding blocks is a partitioning.

The blocks (e.g., CTUs or CUs) may be grouped in various ways in a picture. As one example, a brick may refer to a rectangular region of CTU rows within a particular tile in a picture. A tile may be a rectangular region of CTUs within a particular tile column and a particular tile row in a picture. A tile column refers to a rectangular region of CTUs having a height equal to the height of the picture and a width specified by syntax elements (e.g., such as in a picture parameter set). A tile row refers to a rectangular region of CTUs having a height specified by syntax elements (e.g., such as in a picture parameter set) and a width equal to the width of the picture.

In some examples, a tile may be partitioned into multiple bricks, each of which may include one or more CTU rows within the tile. A tile that is not partitioned into multiple bricks may also be referred to as a brick. However, a brick that is a true subset of a tile may not be referred to as a tile. The bricks in a picture may also be arranged in a slice. A slice may be an integer quantity of bricks of a picture that may be exclusively contained in a single network abstraction layer (NAL) unit. In some examples, a slice includes either a quantity of complete tiles or only a consecutive sequence of complete bricks of one tile.

This disclosure may use "N×N" and "N by N" interchangeably to refer to the sample dimensions of a block (such as a CU or other video block) in terms of vertical and horizontal dimensions, e.g., 16×16 samples or 16 by 16 samples. In general, a 16×16 CU will have 16 samples in a vertical direction (y=16) and 16 samples in a horizontal direction (x=16). Likewise, an N×N CU generally has N samples in a vertical direction and N samples in a horizontal direction, where N represents a nonnegative integer value. The samples in a CU may be arranged in rows and columns. Moreover, CUs need not necessarily have the same quantity of samples in the horizontal direction as in the vertical direction. For example, CUs may comprise N×M samples, where M is not necessarily equal to N.

Video encoder 200 encodes video data for CUs representing prediction and/or residual information, and other information. The prediction information indicates how the CU is to be predicted in order to form a prediction block for the CU. The residual information generally represents sample-by-sample differences between samples of the CU prior to encoding and the prediction block.

To predict a CU, video encoder 200 may generally form a prediction block for the CU through inter-prediction or intra-prediction. Inter-prediction generally refers to predicting the CU from data of a previously coded picture, whereas intra-prediction generally refers to predicting the CU from previously coded data of the same picture. To perform inter-prediction, video encoder 200 may generate the prediction block using one or more motion vectors. Video encoder 200 may generally perform a motion search to identify a reference block that closely matches the CU, e.g., in terms of differences between the CU and the reference block. Video encoder 200 may calculate a difference metric using a sum of absolute difference (SAD), sum of squared differences (SSD), mean absolute difference (MAD), mean squared differences (MSD), or other such difference calculations to determine whether a reference block closely matches the current CU. In some examples, video encoder 200 may predict the current CU using uni-directional prediction or bi-directional prediction.

Some examples of VVC also provide an affine motion compensation mode, which may be considered an inter-prediction mode. In affine motion compensation mode, video encoder 200 may determine two or more motion vectors that represent non-translational motion, such as zoom in or out, rotation, perspective motion, or other irregular motion types.

To perform intra-prediction, video encoder 200 may select an intra-prediction mode to generate the prediction block. Some examples of VVC provide sixty-seven intra-prediction modes, including various directional modes, as well as planar mode and DC mode. In general, video encoder 200 selects an intra-prediction mode that describes neighboring samples to a current block (e.g., a block of a CU) from which to predict samples of the current block. Such samples may generally be above, above and to the left, or to the left of the current block in the same picture as the current block, assuming video encoder 200 codes CTUs and CUs in raster scan order (left to right, top to bottom).

Video encoder 200 encodes data representing the prediction mode for a current block. For example, for inter-prediction modes, video encoder 200 may encode data representing which of the various available inter-prediction modes is used, as well as motion information for the corresponding mode. For uni-directional or bi-directional inter-prediction, for example, video encoder 200 may encode motion vectors using advanced motion vector prediction (AMVP) or merge mode. Video encoder 200 may use similar modes to encode motion vectors for affine motion compensation mode.

AV1 includes two general techniques for encoding and decoding a coding block of video data. The two general techniques are intra prediction (e.g., intra frame prediction or spatial prediction) and inter prediction (e.g., inter frame prediction or temporal prediction). In the context of AV1, when predicting blocks of a current frame of video data using an intra prediction mode, video encoder 200 and video decoder 300 do not use video data from other frames of video data. For most intra prediction modes, video encoder 200 encodes blocks of a current frame based on the difference between sample values in the current block and predicted values generated from reference samples in the same frame. Video encoder 200 determines predicted values generated from the reference samples based on the intra prediction mode.

Following prediction, such as intra-prediction or inter-prediction of a block, video encoder 200 may calculate residual data for the block. The residual data, such as a residual block, represents sample by sample differences between the block and a prediction block for the block, formed using the corresponding prediction mode. Video encoder 200 may apply one or more transforms to the residual block, to produce transformed data in a transform domain instead of the sample domain. For example, video encoder 200 may apply a discrete cosine transform (DCT), an integer transform, a wavelet transform, or a conceptually similar transform to residual video data. Additionally, video encoder 200 may apply a secondary transform following the first transform, such as a mode-dependent non-separable secondary transform (MDNSST), a signal dependent transform, a Karhunen-Loeve transform (KLT), or the like. Video encoder 200 produces transform coefficients following application of the one or more transforms.

As noted above, following any transforms to produce transform coefficients, video encoder 200 may perform quantization of the transform coefficients. Quantization generally refers to a process in which transform coefficients are quantized to possibly reduce the amount of data used to represent the transform coefficients, providing further compression. By performing the quantization process, video encoder 200 may reduce the bit depth associated with some or all of the transform coefficients. For example, video encoder 200 may round an n-bit value down to an m-bit value during quantization, where n is greater than m. In some examples, to perform quantization, video encoder 200 may perform a bitwise right-shift of the value to be quantized.

Following quantization, video encoder 200 may scan the transform coefficients, producing a one-dimensional vector from the two-dimensional matrix including the quantized transform coefficients. The scan may be designed to place higher energy (and therefore lower frequency) transform coefficients at the front of the vector and to place lower energy (and therefore higher frequency) transform coefficients at the back of the vector. In some examples, video encoder 200 may utilize a predefined scan order to scan the quantized transform coefficients to produce a serialized vector, and then entropy encode the quantized transform coefficients of the vector. In other examples, video encoder 200 may perform an adaptive scan. After scanning the quantized transform coefficients to form the one-dimensional vector, video encoder 200 may entropy encode the one-dimensional vector, e.g., according to context-adaptive binary arithmetic coding (CABAC). Video encoder 200 may also entropy encode values for syntax elements describing metadata associated with the encoded video data for use by video decoder 300 in decoding the video data.

To perform CABAC, video encoder 200 may assign a context within a context model to a symbol to be transmitted. The context may relate to, for example, whether neighboring values of the symbol are zero-valued or not. The probability determination may be based on a context assigned to the symbol.

Video encoder 200 may further generate syntax data, such as block-based syntax data, picture-based syntax data, and sequence-based syntax data, to video decoder 300, e.g., in a picture header, a block header, a slice header, or other syntax data, such as a sequence parameter set (SPS), picture parameter set (PPS), or video parameter set (VPS). Video decoder 300 may likewise decode such syntax data to determine how to decode corresponding video data.

In this manner, video encoder 200 may generate a bitstream including encoded video data, e.g., syntax elements describing partitioning of a picture into blocks (e.g., CUs) and prediction and/or residual information for the blocks. Ultimately, video decoder 300 may receive the bitstream and decode the encoded video data.

In general, video decoder 300 performs a reciprocal process to that performed by video encoder 200 to decode the encoded video data of the bitstream. For example, video decoder 300 may decode values for syntax elements of the bitstream using CABAC in a manner substantially similar to, albeit reciprocal to, the CABAC encoding process of video encoder 200. The syntax elements may define partitioning information for partitioning of a picture into CTUs, and partitioning of each CTU according to a corresponding partition structure, such as a QTBT structure, to define CUs of the CTU. The syntax elements may further define prediction and residual information for blocks (e.g., CUs) of video data.

The residual information may be represented by, for example, quantized transform coefficients. Video decoder 300 may inverse quantize and inverse transform the quantized transform coefficients of a block to reproduce a residual block for the block. Video decoder 300 uses a signaled prediction mode (intra- or inter-prediction) and related prediction information (e.g., motion information for inter-prediction) to form a prediction block for the block. Video decoder 300 may then combine the prediction block and the residual block (on a sample-by-sample basis) to reproduce the original block. Video decoder 300 may perform additional processing, such as performing a deblocking process to reduce visual artifacts along boundaries of the block.

This disclosure may generally refer to "signaling" certain information, such as syntax elements. The term "signaling" may generally refer to the communication of values for syntax elements and/or other data used to decode encoded video data. That is, video encoder 200 may signal values for syntax elements in the bitstream. In general, signaling refers to generating a value in the bitstream. As noted above, source device 102 may transport the bitstream to destination device 116 substantially in real time, or not in real time, such as might occur when storing syntax elements to storage device 112 for later retrieval by destination device 116.

In accordance with the techniques of this disclosure, video encoder 200 and video decoder 300 may determine, based on a comparison of a threshold and a quantity of reference samples in a selected template, whether the selected template is allowed. A mode index may indicate which template from among a plurality of templates is the selected template. Each of the templates includes a different set reconstructed samples that neighbor a current CU of a current picture of the video data. If the selected template is allowed and a CCCM mode is to be used for the current CU, video encoder 200 and video decoder 300 may apply the CCCM mode to predict chroma samples of the current CU based on reconstructed luma samples of the current CU and the reference samples in the selected template. If the selected template is not allowed or the CCCM mode is not to be used for the current CU, video encoder 200 and video decoder 300 may use another coding tool, such as a linear mode. The CCCM model may predict chroma samples of the current CU based on application of a filter to luma samples of the current CU. Coefficients of the filter may be based on samples in the selected template. Video encoder 200 and video decoder 300 may encode or decode the current CU based on the predictor for the current CU.

Figure 2:
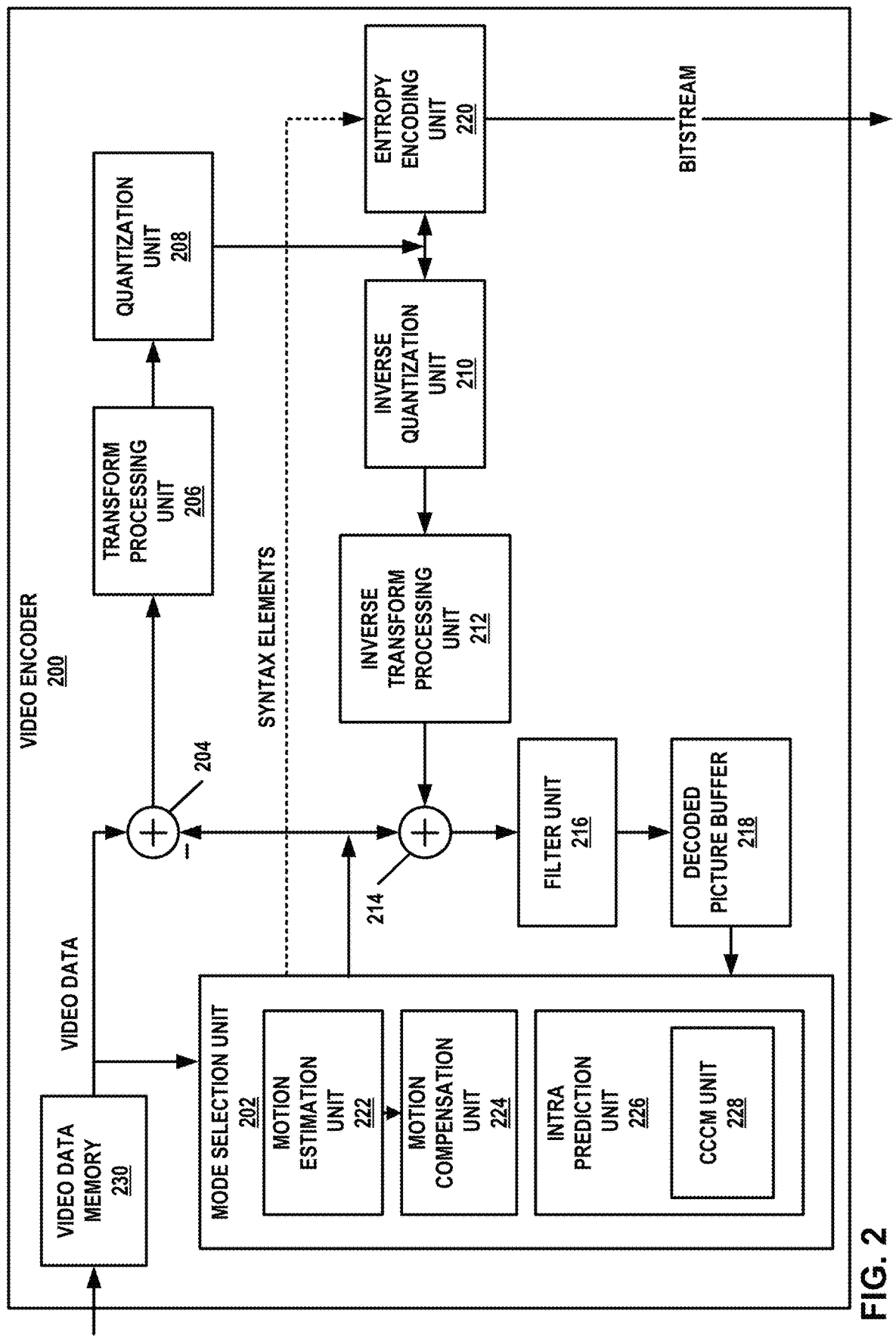
FIG. 2 is a block diagram illustrating an example video encoder that may perform the techniques of this disclosure.

FIG. 2 is a block diagram illustrating an example video encoder 200 that may perform the techniques of this disclosure. FIG. 2 is provided for purposes of explanation and should not be considered limiting of the techniques as broadly exemplified and described in this disclosure. For purposes of explanation, this disclosure describes video encoder 200 according to the techniques of VVC (ITU-T H.266, under development), and HEVC (ITU-T H.265). However, the techniques of this disclosure may be performed by video encoding devices that are configured to other video coding standards and video coding formats, such as AV1 and successors to the AV1 video coding format.

In the example of FIG. 2, video encoder 200 includes video data memory 230, mode selection unit 202, residual generation unit 204, transform processing unit 206, quantization unit 208, inverse quantization unit 210, inverse transform processing unit 212, reconstruction unit 214, filter unit 216, decoded picture buffer (DPB) 218, and entropy encoding unit 220. Any or all of video data memory 230, mode selection unit 202, residual generation unit 204, transform processing unit 206, quantization unit 208, inverse quantization unit 210, inverse transform processing unit 212, reconstruction unit 214, filter unit 216, DPB 218, and entropy encoding unit 220 may be implemented in one or more processors or in processing circuitry. For instance, the units of video encoder 200 may be implemented as one or more circuits or logic elements as part of hardware circuitry, or as part of a processor, ASIC, or FPGA. Moreover, video encoder 200 may include additional or alternative processors or processing circuitry to perform these and other functions.

Video data memory 230 may store video data to be encoded by the components of video encoder 200. Video encoder 200 may receive the video data stored in video data memory 230 from, for example, video source 104 (FIG. 1). DPB 218 may act as a reference picture memory that stores reference video data for use in prediction of subsequent video data by video encoder 200. Video data memory 230 and DPB 218 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 230 and DPB 218 may be provided by the same memory device or separate memory devices. In various examples, video data memory 230 may be on-chip with other components of video encoder 200, as illustrated, or off-chip relative to those components.

In this disclosure, reference to video data memory 230 should not be interpreted as being limited to memory internal to video encoder 200, unless specifically described as such, or memory external to video encoder 200, unless specifically described as such. Rather, reference to video data memory 230 should be understood as reference memory that stores video data that video encoder 200 receives for encoding (e.g., video data for a current block that is to be encoded). Memory 106 of FIG. 1 may also provide temporary storage of outputs from the various units of video encoder 200.

The various units of FIG. 2 are illustrated to assist with understanding the operations performed by video encoder 200. The units may be implemented as fixed-function circuits, programmable circuits, or a combination thereof. Fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

Video encoder 200 may include arithmetic logic units (ALUs), elementary function units (EFUs), digital circuits, analog circuits, and/or programmable cores, formed from programmable circuits. In examples where the operations of video encoder 200 are performed using software executed by the programmable circuits, memory 106 (FIG. 1) may store the instructions (e.g., object code) of the software that video encoder 200 receives and executes, or another memory within video encoder 200 (not shown) may store such instructions.

Video data memory 230 is configured to store received video data. Video encoder 200 may retrieve a picture of the video data from video data memory 230 and provide the video data to residual generation unit 204 and mode selection unit 202. Video data in video data memory 230 may be raw video data that is to be encoded.

Mode selection unit 202 includes a motion estimation unit 222, a motion compensation unit 224, and an intra prediction unit 226. Mode selection unit 202 may include additional functional units to perform video prediction in accordance with other prediction modes. As examples, mode selection unit 202 may include a palette unit, an intra-block copy unit (which may be part of motion estimation unit 222 and/or motion compensation unit 224), an affine unit, a linear model (LM) unit, or the like.

Mode selection unit 202 generally coordinates multiple encoding passes to test combinations of encoding parameters and resulting rate-distortion values for such combinations. The encoding parameters may include partitioning of CTUs into CUs, prediction modes for the CUs, transform types for residual data of the CUs, quantization parameters for residual data of the CUs, and so on. Mode selection unit 202 may ultimately select the combination of encoding parameters having rate-distortion values that are better than the other tested combinations.

Video encoder 200 may partition a picture retrieved from video data memory 230 into a series of CTUs, and encapsulate one or more CTUs within a slice. Mode selection unit 202 may partition a CTU of the picture in accordance with a tree structure, such as the MTT structure, QTBT structure. superblock structure, or the quad-tree structure described above. As described above, video encoder 200 may form one or more CUs from partitioning a CTU according to the tree structure. Such a CU may also be referred to generally as a "video block" or "block."

In general, mode selection unit 202 also controls the components thereof (e.g., motion estimation unit 222, motion compensation unit 224, and intra prediction unit 226) to generate a prediction block for a current block (e.g., a current CU, or in HEVC, the overlapping portion of a PU and a TU). For inter-prediction of a current block, motion estimation unit 222 may perform a motion search to identify one or more closely matching reference blocks in one or more reference pictures (e.g., one or more previously coded pictures stored in DPB 218). In particular, motion estimation unit 222 may calculate a value representative of how similar a potential reference block is to the current block, e.g., according to sum of absolute difference (SAD), sum of squared differences (SSD), mean absolute difference (MAD), mean squared differences (MSD), or the like. Motion estimation unit 222 may generally perform these calculations using sample-by-sample differences between the current block and the reference block being considered. Motion estimation unit 222 may identify a reference block having a lowest value resulting from these calculations, indicating a reference block that most closely matches the current block.

Motion estimation unit 222 may form one or more motion vectors (MVs) that defines the positions of the reference blocks in the reference pictures relative to the position of the current block in a current picture. Motion estimation unit 222 may then provide the motion vectors to motion compensation unit 224. For example, for uni-directional inter-prediction, motion estimation unit 222 may provide a single motion vector, whereas for bi-directional inter-prediction, motion estimation unit 222 may provide two motion vectors. Motion compensation unit 224 may then generate a prediction block using the motion vectors. For example, motion compensation unit 224 may retrieve data of the reference block using the motion vector. As another example, if the motion vector has fractional sample precision, motion compensation unit 224 may interpolate values for the prediction block according to one or more interpolation filters. Moreover, for bi-directional inter-prediction, motion compensation unit 224 may retrieve data for two reference blocks identified by respective motion vectors and combine the retrieved data, e.g., through sample-by-sample averaging or weighted averaging.

When operating according to the AV1 video coding format, motion estimation unit 222 and motion compensation unit 224 may be configured to encode coding blocks of video data (e.g., both luma and chroma coding blocks) using translational motion compensation, affine motion compensation, overlapped block motion compensation (OBMC), and/or compound inter-intra prediction.

As another example, for intra-prediction, or intra-prediction coding, intra prediction unit 226 may generate the prediction block from samples neighboring the current block. For example, for directional modes, intra prediction unit 226 may generally mathematically combine values of neighboring samples and populate these calculated values in the defined direction across the current block to produce the prediction block. As another example, for DC mode, intra prediction unit 226 may calculate an average of the neighboring samples to the current block and generate the prediction block to include this resulting average for each sample of the prediction block.

When operating according to the AV1 video coding format, intra prediction unit 226 may be configured to encode coding blocks of video data (e.g., both luma and chroma coding blocks) using directional intra prediction, non-directional intra prediction, recursive filter intra prediction, chroma-from-luma (CFL) prediction, intra block copy (IBC), and/or color palette mode. Mode selection unit 202 may include additional functional units to perform video prediction in accordance with other prediction modes. In the example of FIG. 2, intra prediction unit 226 includes a CCCM unit 228 that generates predictors using the CCCM mode in accordance with techniques of this disclosure.

Mode selection unit 202 provides the prediction block to residual generation unit 204. Residual generation unit 204 receives a raw, unencoded version of the current block from video data memory 230 and the prediction block from mode selection unit 202. Residual generation unit 204 calculates sample-by-sample differences between the current block and the prediction block. The resulting sample-by-sample differences define a residual block for the current block. In some examples, residual generation unit 204 may also determine differences between sample values in the residual block to generate a residual block using residual differential pulse code modulation (RDPCM). In some examples, residual generation unit 204 may be formed using one or more subtractor circuits that perform binary subtraction.

In examples where mode selection unit 202 partitions CUs into PUs, each PU may be associated with a luma prediction unit and corresponding chroma prediction units. Video encoder 200 and video decoder 300 may support PUs having various sizes. As indicated above, the size of a CU may refer to the size of the luma coding block of the CU and the size of a PU may refer to the size of a luma prediction unit of the PU. Assuming that the size of a particular CU is 2 N×2 N, video encoder 200 may support PU sizes of 2 N×2N or N×N for intra prediction, and symmetric PU sizes of 2 N×2 N, 2 N×N, N×2N, N×N, or similar for inter prediction. Video encoder 200 and video decoder 300 may also support asymmetric partitioning for PU sizes of 2 N×nU, 2 N×nD, nL×2 N, and nR×2 N for inter prediction.

In examples where mode selection unit 202 does not further partition a CU into PUs, each CU may be associated with a luma coding block and corresponding chroma coding blocks. As above, the size of a CU may refer to the size of the luma coding block of the CU. Video encoder 200 and video decoder 300 may support CU sizes of 2 N×2 N, 2 N×N, or N×2 N.

For other video coding techniques such as an intra-block copy mode coding, an affine-mode coding, and linear model (LM) mode coding, as some examples, mode selection unit 202, via respective units associated with the coding techniques, generates a prediction block for the current block being encoded. In some examples, such as palette mode coding, mode selection unit 202 may not generate a prediction block, and instead generate syntax elements that indicate the manner in which to reconstruct the block based on a selected palette. In such modes, mode selection unit 202 may provide these syntax elements to entropy encoding unit 220 to be encoded.

As described above, residual generation unit 204 receives the video data for the current block and the corresponding prediction block. Residual generation unit 204 then generates a residual block for the current block. To generate the residual block, residual generation unit 204 calculates sample-by-sample differences between the prediction block and the current block.

Transform processing unit 206 applies one or more transforms to the residual block to generate a block of transform coefficients (referred to herein as a "transform coefficient block"). Transform processing unit 206 may apply various transforms to a residual block to form the transform coefficient block. For example, transform processing unit 206 may apply a discrete cosine transform (DCT), a directional transform, a Karhunen-Loeve transform (KLT), or a conceptually similar transform to a residual block. In some examples, transform processing unit 206 may perform multiple transforms to a residual block, e.g., a primary transform and a secondary transform, such as a rotational transform. In some examples, transform processing unit 206 does not apply transforms to a residual block.

When operating according to AV1, transform processing unit 206 may apply one or more transforms to the residual block to generate a block of transform coefficients (referred to herein as a "transform coefficient block"). Transform processing unit 206 may apply various transforms to a residual block to form the transform coefficient block. For example, transform processing unit 206 may apply a horizontal/vertical transform combination that may include a discrete cosine transform (DCT), an asymmetric discrete sine transform (ADST), a flipped ADST (e.g., an ADST in reverse order), and an identity transform (IDTX). When using an identity transform, the transform is skipped in one of the vertical or horizontal directions. In some examples, transform processing may be skipped.

Quantization unit 208 may quantize the transform coefficients in a transform coefficient block, to produce a quantized transform coefficient block. Quantization unit 208 may quantize transform coefficients of a transform coefficient block according to a quantization parameter (QP) value associated with the current block. Video encoder 200 (e.g., via mode selection unit 202) may adjust the degree of quantization applied to the transform coefficient blocks associated with the current block by adjusting the QP value associated with the CU. Quantization may introduce loss of information, and thus, quantized transform coefficients may have lower precision than the original transform coefficients produced by transform processing unit 206.

Inverse quantization unit 210 and inverse transform processing unit 212 may apply inverse quantization and inverse transforms to a quantized transform coefficient block, respectively, to reconstruct a residual block from the transform coefficient block. Reconstruction unit 214 may produce a reconstructed block corresponding to the current block (albeit potentially with some degree of distortion) based on the reconstructed residual block and a prediction block generated by mode selection unit 202. For example, reconstruction unit 214 may add samples of the reconstructed residual block to corresponding samples from the prediction block generated by mode selection unit 202 to produce the reconstructed block.

Filter unit 216 may perform one or more filter operations on reconstructed blocks. For example, filter unit 216 may perform deblocking operations to reduce blockiness artifacts along edges of CUs. Operations of filter unit 216 may be skipped, in some examples.

When operating according to AV1, filter unit 216 may perform one or more filter operations on reconstructed blocks. For example, filter unit 216 may perform deblocking operations to reduce blockiness artifacts along edges of CUs. In other examples, filter unit 216 may apply a constrained directional enhancement filter (CDEF), which may be applied after deblocking, and may include the application of non-separable, non-linear, low-pass directional filters based on estimated edge directions. Filter unit 216 may also include a loop restoration filter, which is applied after CDEF, and may include a separable symmetric normalized Wiener filter or a dual self-guided filter.

Video encoder 200 stores reconstructed blocks in DPB 218. For instance, in examples where operations of filter unit 216 are not performed, reconstruction unit 214 may store reconstructed blocks to DPB 218. In examples where operations of filter unit 216 are performed, filter unit 216 may store the filtered reconstructed blocks to DPB 218. Motion estimation unit 222 and motion compensation unit 224 may retrieve a reference picture from DPB 218, formed from the reconstructed (and potentially filtered) blocks, to inter-predict blocks of subsequently encoded pictures. In addition, intra prediction unit 226 may use reconstructed blocks in DPB 218 of a current picture to intra-predict other blocks in the current picture.

In general, entropy encoding unit 220 may entropy encode syntax elements received from other functional components of video encoder 200. For example, entropy encoding unit 220 may entropy encode quantized transform coefficient blocks from quantization unit 208. As another example, entropy encoding unit 220 may entropy encode prediction syntax elements (e.g., motion information for inter-prediction or intra-mode information for intra-prediction) from mode selection unit 202. Entropy encoding unit 220 may perform one or more entropy encoding operations on the syntax elements, which are another example of video data, to generate entropy-encoded data. For example, entropy encoding unit 220 may perform a context-adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. In some examples, entropy encoding unit 220 may operate in bypass mode where syntax elements are not entropy encoded.

Video encoder 200 may output a bitstream that includes the entropy encoded syntax elements needed to reconstruct blocks of a slice or picture. In particular, entropy encoding unit 220 may output the bitstream.

In accordance with AV1, entropy encoding unit 220 may be configured as a symbol-to-symbol adaptive multi-symbol arithmetic coder. A syntax element in AV1 includes an alphabet of N elements, and a context (e.g., probability model) includes a set of N probabilities. Entropy encoding unit 220 may store the probabilities as n-bit (e.g., 15-bit) cumulative distribution functions (CDFs). Entropy encoding unit 220 may perform recursive scaling, with an update factor based on the alphabet size, to update the contexts.

The operations described above are described with respect to a block. Such description should be understood as being operations for a luma coding block and/or chroma coding blocks. As described above, in some examples, the luma coding block and chroma coding blocks are luma and chroma components of a CU. In some examples, the luma coding block and the chroma coding blocks are luma and chroma components of a PU.

In some examples, operations performed with respect to a luma coding block need not be repeated for the chroma coding blocks. As one example, operations to identify a motion vector (MV) and reference picture for a luma coding block need not be repeated for identifying a MV and reference picture for the chroma blocks. Rather, the MV for the luma coding block may be scaled to determine the MV for the chroma blocks, and the reference picture may be the same. As another example, the intra-prediction process may be the same for the luma coding block and the chroma coding blocks.

As mentioned above, intra prediction unit 226 may include CCCM unit 228. CCCM unit 228 may determine, based on a comparison of a threshold and a quantity of reference samples in a selected template, whether the selected template is allowed. Video encoder 200 may signal a mode index that indicates which template from among a plurality of templates is the selected template. Each of the templates includes a different set of reconstructed samples that neighbor a current CU of a current picture of the video data. Based on determining that the selected template is allowed and that a CCCM mode is to be used for encoding the current CU, CCCM unit 228 may apply the CCCM mode to predict chroma samples of the current CU based on reconstructed luma samples of the current CU and the reference samples in the selected template. Other units of video encoder 200 may use the predicted chroma samples as described above.

In this manner, video encoder 200 represents an example of a video encoding device including a memory configured to store video data, and one or more processing units implemented in circuitry and configured to determine, based on a comparison of a threshold and a quantity of reference samples in a selected template, whether the selected template is allowed. Based on determining that the selected template is allowed and that a convolutional cross-component model (CCCM) mode is to be used, the one or more processors may apply the CCCM mode to predict chroma samples of the current CU based on reconstructed luma samples of the current CU and the reference samples in the selected template. Additionally, the one or more processors may encode the current CU based on the predicted chroma samples of the current CU.

Figure 3:
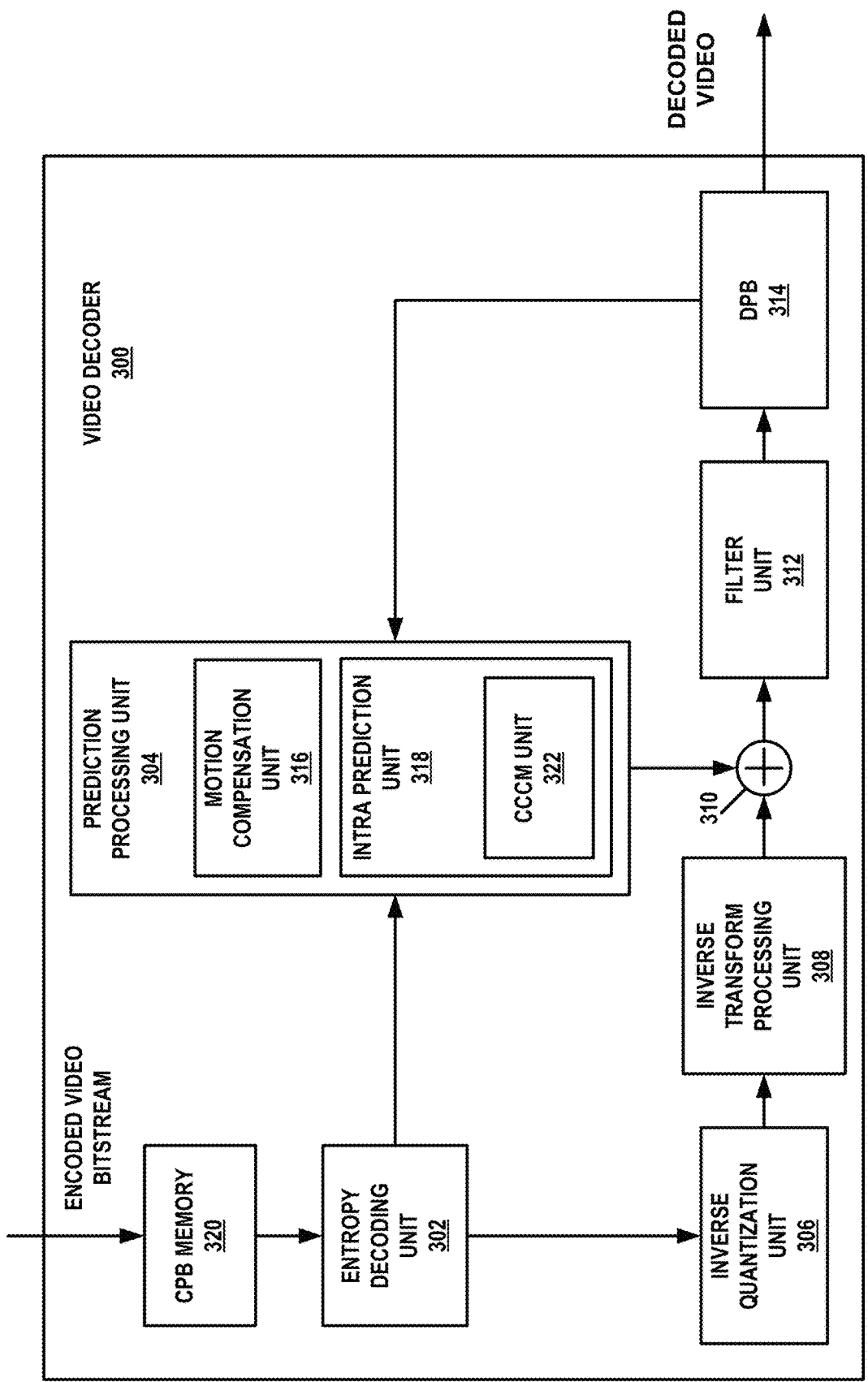
FIG. 3 is a block diagram illustrating an example video decoder that may perform the techniques of this disclosure.

FIG. 3 is a block diagram illustrating an example video decoder 300 that may perform the techniques of this disclosure. FIG. 3 is provided for purposes of explanation and is not limiting on the techniques as broadly exemplified and described in this disclosure. For purposes of explanation, this disclosure describes video decoder 300 according to the techniques of VVC (ITU-T H.266, under development), and HEVC (ITU-T H.265). However, the techniques of this disclosure may be performed by video coding devices that are configured to other video coding standards.

In the example of FIG. 3, video decoder 300 includes coded picture buffer (CPB) memory 320, entropy decoding unit 302, prediction processing unit 304, inverse quantization unit 306, inverse transform processing unit 308, reconstruction unit 310, filter unit 312, and decoded picture buffer (DPB) 314. Any or all of CPB memory 320, entropy decoding unit 302, prediction processing unit 304, inverse quantization unit 306, inverse transform processing unit 308, reconstruction unit 310, filter unit 312, and DPB 314 may be implemented in one or more processors or in processing circuitry. For instance, the units of video decoder 300 may be implemented as one or more circuits or logic elements as part of hardware circuitry, or as part of a processor, ASIC, or FPGA. Moreover, video decoder 300 may include additional or alternative processors or processing circuitry to perform these and other functions.

Prediction processing unit 304 includes motion compensation unit 316 and intra prediction unit 318. Prediction processing unit 304 may include additional units to perform prediction in accordance with other prediction modes. As examples, prediction processing unit 304 may include a palette unit, an intra-block copy unit (which may form part of motion compensation unit 316), an affine unit, a linear model (LM) unit, or the like. In other examples, video decoder 300 may include more, fewer, or different functional components.

When operating according to AV1, motion compensation unit 316 may be configured to decode coding blocks of video data (e.g., both luma and chroma coding blocks) using translational motion compensation, affine motion compensation, OBMC, and/or compound inter-intra prediction, as described above. Intra prediction unit 318 may be configured to decode coding blocks of video data (e.g., both luma and chroma coding blocks) using directional intra prediction, non-directional intra prediction, recursive filter intra prediction, CFL, intra block copy (IBC), and/or color palette mode, as described above.

CPB memory 320 may store video data, such as an encoded video bitstream, to be decoded by the components of video decoder 300. The video data stored in CPB memory 320 may be obtained, for example, from computer-readable medium 110 (FIG. 1). CPB memory 320 may include a CPB that stores encoded video data (e.g., syntax elements) from an encoded video bitstream. Also, CPB memory 320 may store video data other than syntax elements of a coded picture, such as temporary data representing outputs from the various units of video decoder 300. DPB 314 generally stores decoded pictures, which video decoder 300 may output and/or use as reference video data when decoding subsequent data or pictures of the encoded video bitstream. CPB memory 320 and DPB 314 may be formed by any of a variety of memory devices, such as DRAM, including SDRAM, MRAM, RRAM, or other types of memory devices. CPB memory 320 and DPB 314 may be provided by the same memory device or separate memory devices. In various examples, CPB memory 320 may be on-chip with other components of video decoder 300, or off-chip relative to those components.

Additionally or alternatively, in some examples, video decoder 300 may retrieve coded video data from memory 120 (FIG. 1). That is, memory 120 may store data as discussed above with CPB memory 320. Likewise, memory 120 may store instructions to be executed by video decoder 300, when some or all of the functionality of video decoder 300 is implemented in software to be executed by processing circuitry of video decoder 300.

The various units shown in FIG. 3 are illustrated to assist with understanding the operations performed by video decoder 300. The units may be implemented as fixed-function circuits, programmable circuits, or a combination thereof. Similar to FIG. 2, fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

Video decoder 300 may include ALUs, EFUs, digital circuits, analog circuits, and/or programmable cores formed from programmable circuits. In examples where the operations of video decoder 300 are performed by software executing on the programmable circuits, on-chip or off-chip memory may store instructions (e.g., object code) of the software that video decoder 300 receives and executes.

Entropy decoding unit 302 may receive encoded video data from the CPB and entropy decode the video data to reproduce syntax elements. Prediction processing unit 304, inverse quantization unit 306, inverse transform processing unit 308, reconstruction unit 310, and filter unit 312 may generate decoded video data based on the syntax elements extracted from the bitstream.

In general, video decoder 300 reconstructs a picture on a block-by-block basis. Video decoder 300 may perform a reconstruction operation on each block individually (where the block currently being reconstructed, i.e., decoded, may be referred to as a "current block").

Entropy decoding unit 302 may entropy decode syntax elements defining quantized transform coefficients of a quantized transform coefficient block, as well as transform information, such as a quantization parameter (QP) and/or transform mode indication(s). Inverse quantization unit 306 may use the QP associated with the quantized transform coefficient block to determine a degree of quantization and, likewise, a degree of inverse quantization for inverse quantization unit 306 to apply. Inverse quantization unit 306 may, for example, perform a bitwise left-shift operation to inverse quantize the quantized transform coefficients. Inverse quantization unit 306 may thereby form a transform coefficient block including transform coefficients.

After inverse quantization unit 306 forms the transform coefficient block, inverse transform processing unit 308 may apply one or more inverse transforms to the transform coefficient block to generate a residual block associated with the current block. For example, inverse transform processing unit 308 may apply an inverse DCT, an inverse integer transform, an inverse Karhunen-Loeve transform (KLT), an inverse rotational transform, an inverse directional transform, or another inverse transform to the transform coefficient block.

Furthermore, prediction processing unit 304 generates a prediction block according to prediction information syntax elements that were entropy decoded by entropy decoding unit 302. For example, if the prediction information syntax elements indicate that the current block is inter-predicted, motion compensation unit 316 may generate the prediction block. In this case, the prediction information syntax elements may indicate a reference picture in DPB 314 from which to retrieve a reference block, as well as a motion vector identifying a location of the reference block in the reference picture relative to the location of the current block in the current picture. Motion compensation unit 316 may generally perform the inter-prediction process in a manner that is substantially similar to that described with respect to motion compensation unit 224 (FIG. 2).

As another example, if the prediction information syntax elements indicate that the current block is intra-predicted, intra prediction unit 318 may generate the prediction block according to an intra-prediction mode indicated by the prediction information syntax elements. Again, intra prediction unit 318 may generally perform the intra-prediction process in a manner that is substantially similar to that described with respect to intra prediction unit 226 (FIG. 2). Intra prediction unit 318 may retrieve data of neighboring samples to the current block from DPB 314. In the example of FIG. 3, intra prediction unit 318 includes a CCCM unit 322. CCCM unit 322 may perform a CCCM mode in accordance with the techniques of this disclosure.

Reconstruction unit 310 may reconstruct the current block using the prediction block and the residual block. For example, reconstruction unit 310 may add samples of the residual block to corresponding samples of the prediction block to reconstruct the current block.

Filter unit 312 may perform one or more filter operations on reconstructed blocks. For example, filter unit 312 may perform deblocking operations to reduce blockiness artifacts along edges of the reconstructed blocks. Operations of filter unit 312 are not necessarily performed in all examples.

Video decoder 300 may store the reconstructed blocks in DPB 314. For instance, in examples where operations of filter unit 312 are not performed, reconstruction unit 310 may store reconstructed blocks to DPB 314. In examples where operations of filter unit 312 are performed, filter unit 312 may store the filtered reconstructed blocks to DPB 314. As discussed above, DPB 314 may provide reference information, such as samples of a current picture for intra-prediction and previously decoded pictures for subsequent motion compensation, to prediction processing unit 304. Moreover, video decoder 300 may output decoded pictures (e.g., decoded video) from DPB 314 for subsequent presentation on a display device, such as display device 118 of FIG. 1.

As mentioned above, intra prediction unit 318 may include CCCM unit 332. CCCM unit 228 may determine, based on a comparison of a threshold and a quantity of reference samples in a selected template, whether the selected template is allowed. Video decoder 300 may obtain from a bitstream a mode index that indicates which template from among a plurality of templates is the selected template. Each of the templates includes a different set of reconstructed samples that neighbor a current CU of a current picture of the video data. Based on determining that the selected template is allowed and that a CCCM mode is to be used for encoding the current CU, CCCM unit 322 may apply the CCCM mode to predict chroma samples of the current CU based on reconstructed luma samples of the current CU and the reference samples in the selected template. Other units of video decoder 300 may use the predicted chroma samples as described above.

In this manner, video decoder 300 represents an example of a video decoding device including a memory configured to store video data, and one or more processing units implemented in circuitry and configured to determine, based on a comparison of a threshold and a quantity of reference samples in a selected template, whether the selected template is allowed. Based on determining that the selected template is allowed and that a convolutional cross-component model (CCCM) mode is to be used, the one or more processors may apply the CCCM mode to predict chroma samples of the current CU based on reconstructed luma samples of the current CU and the reference samples in the selected template. Additionally, the one or more processors may decode the current CU based on the predicted chroma samples of the current CU.

Versatile Video Coding (VVC), a latest video coding standard, was developed by Joint Video Experts Team (JVET) of ITU-T and ISO/IEC to achieve substantial compression capability beyond HEVC for a broaden range of applications. VVC specification has been finalized in July 2020 and published by both ITU-T and ISO/IEC. The VVC specification specifies normative bitstream and picture formats, high level syntax (HLS) and coding unit level syntax, and the parsing and decoding process. VVC also specifies profiles/tiers/levels (PTL) restrictions, byte stream format, hypothetical reference decoder and supplemental enhancement information (SEI) in the annex.

Starting from April 2021, JVET has been developing an Enhanced Compression Model (ECM) software to enhance compression capability beyond VVC. The set of coding tools in the ECM software encompasses all functional blocks in the hybrid video coding framework, including intra prediction, inter prediction, transform and coefficient coding, in-loop filtering, and entropy coding. The techniques of this disclosure can be applied to ECM and state of the art video codecs such as VVC, AV1, etc.

In ECM-5.0, there are 12 intra modes for chroma intra mode coding, which are categorized into 2 chroma mode lists: a cross-component linear model (CCLM) mode list and a non-CCLM mode list. The CCLM mode list includes six cross-component linear model modes, i.e., LM, and LM_L, LM_T, MMLM, MMLM_L, and MMLM_T. The non-CCLM mode list includes one chroma DIMD (decoder-side intra mode derivation) mode (Li et al., "EE2-1.2: On chroma intra prediction," Joint Video Experts Team (JVET) of ITU-T SG 16 WP 3 and ISO/IEC JTC 1/SC 29, 26 Meeting, by teleconference, 20-29 April 2022, document JVET-Z0051-v2 (hereinafter, "JVET-Z0051")), and five traditional intra modes, i.e., direct mode (DM) and default modes.

Figure 4:
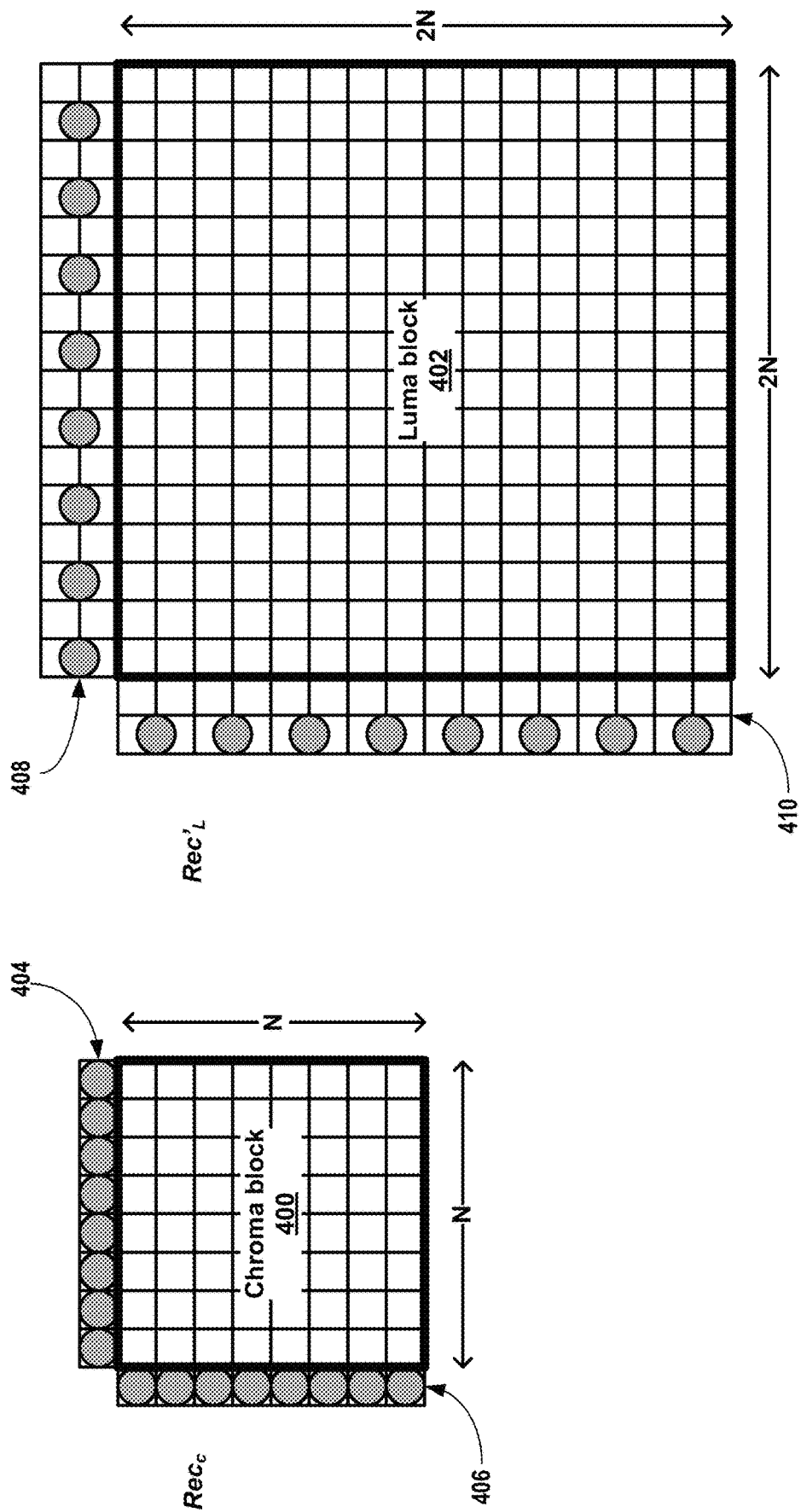
FIG. 4 is a conceptual diagram illustrating example luma and chroma samples used for the derivation of a linear model.

Linear model (LM) mode derives a linear model between the luma and chroma components, i.e., $Pred_C = a \times Rec_L + b$, where $Pred_C$ is the chroma predictors and $Rec_L$ is luma collocated reconstructed samples. The LM mode uses the pairs of the neighboring reconstructed luma pixels and the neighboring reconstructed chroma pixels to derive parameters of the linear model, i.e., a and b, with the linear regression approach as shown in FIG. 4. FIG. 4 is a conceptual diagram illustrating example luma and chroma samples used for the derivation of a linear model. Specifically, FIG. 4 illustrates a chroma block 400 containing chroma samples and a corresponding luma block 402 containing luma samples. A set of reference samples 404 are located above chroma block 400 and a set of reference samples 406 are located left of chroma block 400. A set of reference samples 408 are located above luma block 402 and a set of reference samples 410 are located above luma block 402. Luma block 402 has twice as many samples (2 N) as chroma block 400 in both the horizontal and vertical directions. For this reason, each chroma sample of chroma block 400 (and each of reference samples 404 and reference samples 406) corresponds to a position midway between two of the luma samples. Accordingly, as part of determining a linear model, a video coder (e.g., video encoder 200 or video decoder 300) may interpolate values between specific luma reference samples 408 and luma reference samples 410. The interpolated values are indicated in FIG. 4 as gray-filled circles. Thus, the video coder may use the chroma and luma values corresponding to positions indicated by the gray-filled circles for determining the linear model.

Figure 5:
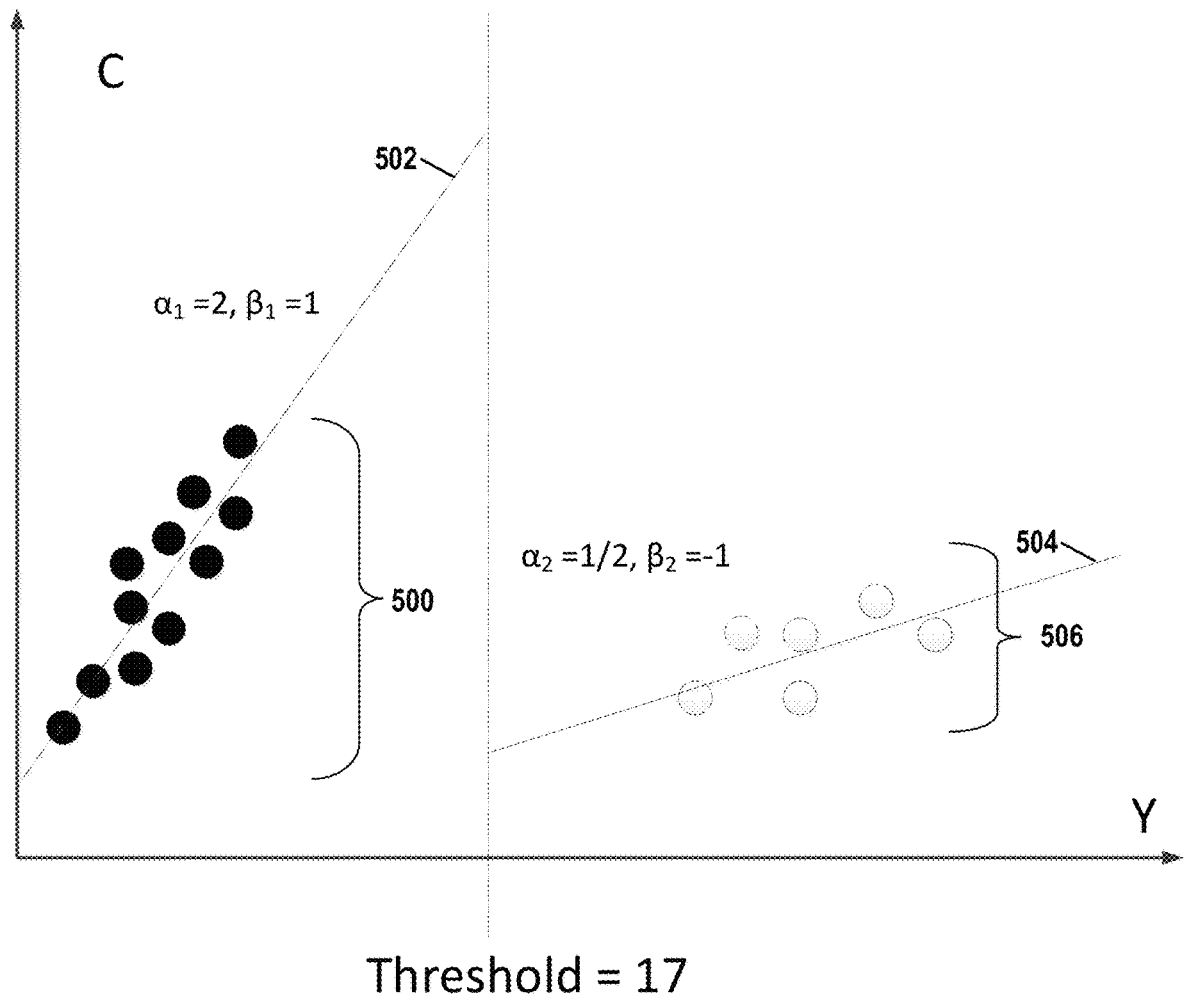
FIG. 5 is a conceptual diagram illustrating an example of classifying neighboring samples into two groups.

FIG. 5 is a conceptual diagram illustrating an example of classifying neighboring samples into two groups. Multi-model LM (MMLM) mode involves where two linear models between the luma neighboring reconstructed samples and chroma neighboring reconstructed samples are derived by classifying the sample pairs into two groups using a threshold which is the average of the luma neighboring reconstructed samples as shown in FIG. 5. In the example of FIG. 5, a first linear model (represented by line 500) models a linear relationship between a first group of chroma samples 502 and their collocated luma values. The first linear model is defined by a slope value $\alpha_1 = 2$ and an intercept value $\beta_1 = 1$. A second linear model (represented by line 504) models a linear relationship between a second group of chroma samples 506 and their collocated luma values. The second linear model is defined by a slope value $\alpha_1 = \frac{1}{2}$ and an intercept value $\beta_1 = -1$.

LM and MMLM use left samples and top samples to derive the linear models. LM_L and MMLM_L use the left samples only (without top samples) to derive the linear models. Instead, LM_T and MMLM_T use the top samples only (without left samples) to derive the linear models.

Figure 6:
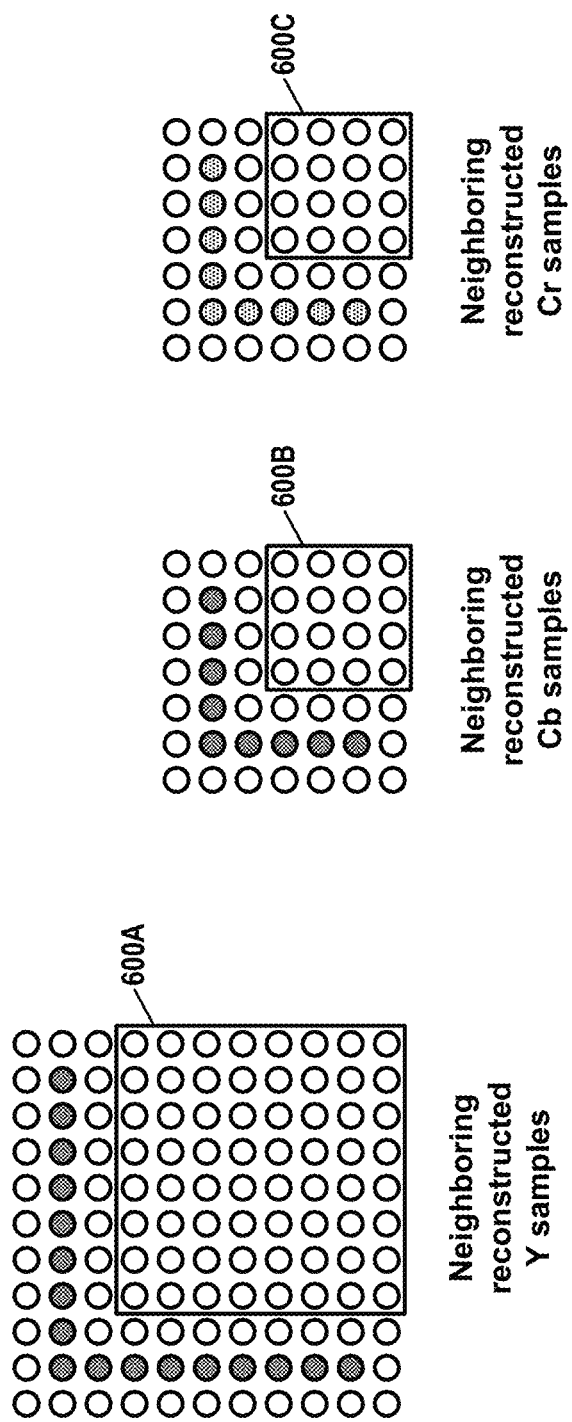
FIG. 6 is a conceptual diagram illustrating neighboring reconstructed samples used for chroma decoder-side intra mode derivation.

FIG. 6 is a conceptual diagram illustrating neighboring reconstructed samples used for chroma decoder-side intra mode derivation (DIMD). As shown in FIG. 6, the chroma DIMD mode derives an intra mode based on a Histogram of Gradient (HoG) computation from the neighbouring reconstructed luma samples of the collocated reconstructed luma block and neighbouring reconstructed chroma samples of the current chroma CUs (CUs in Cb component and Cr component). If one of default modes, i.e., Planar mode, Horizontal mode, Vertical mode, and DC mode is the same as DM mode, then the default mode is replaced with Diagonal mode. In the example of FIG. 6, block 600A contains luma samples of the current block, block 600B contains Cb samples of the current block, and block 600C contains Cr samples of the current block. Samples outside of squares 600A, 600B, and 600C are neighboring reconstructed samples.

The signaling for CCLM modes is 10 (LM), 110 (MMLM), 1110 (LM_L), 11110 (LM_A), 111110 (MMLM_L), 111111 (MMLM_A), and the signaling for non-CCLM modes is 00 for DM, 010 for chroma DIMD, and 01100, 01101, 01110, and 01111 for the default modes. In other words, a CCLM flag is first signaled to indicate whether the current CU uses one of CCLM modes or not. If it is CCLM mode, a LM flag is first signaled to indicate if it is LM mode. If LM flag is false, a MMLM flag is further signaled to indicate if it is MMLM mode, and so on. If the CCLM flag indicates the current CU uses non-CCLM mode, a DM flag is signaled if it is DM mode. If the DM flag is not true, a chroma DIMD flag is signaled to indicate if the mode is chroma DIMD mode. If chroma DIMD mode is not true, a 2-bit fixed length coding is parsed to indicate which default mode is used.

ECM-5.0 adopted a slope adjustment technique proposed in Lainema et al., "EE2-1.1: Slope Adjustment for CCLM," Joint Video Experts Team (JVET) of ITU-T SG 16 WP 3 and ISO/IEC JTC 1/SC 29, 26 Meeting, by teleconference, 20-29 April 2022, document JVET-Z0049 (hereinafter, "JVET-Z0049") for LM mode and MMLM mode to adjust the slope of the derived linear modes as follows: chromaVal=a'*lumaVal+b', where a'=a+u, b'=b−u*$y_r$, $y_r$ is the average of the reference luma samples, and u is delta value to the slope a, and where chromaVal is a value of a chroma sample and lumaVal is a value of a corresponding luma sample. Although JVET-Z0049 is described with respect to ECM, the techniques of JVET-Z0049 and the techniques of this disclosure may apply with respect to other video codecs.

Figure 7B:
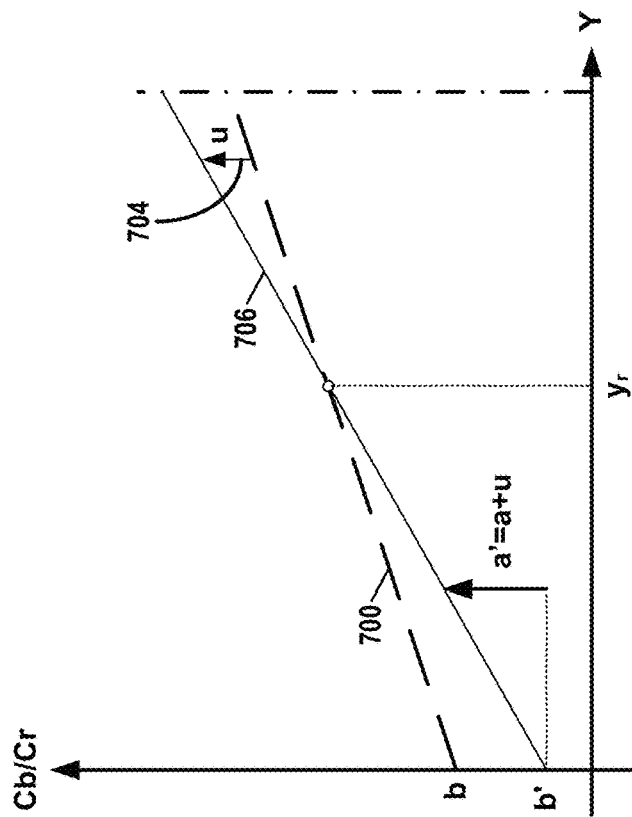
FIG. 7B is a conceptual diagram illustrating an effect of a slope adjustment parameter.
Figure 7A:
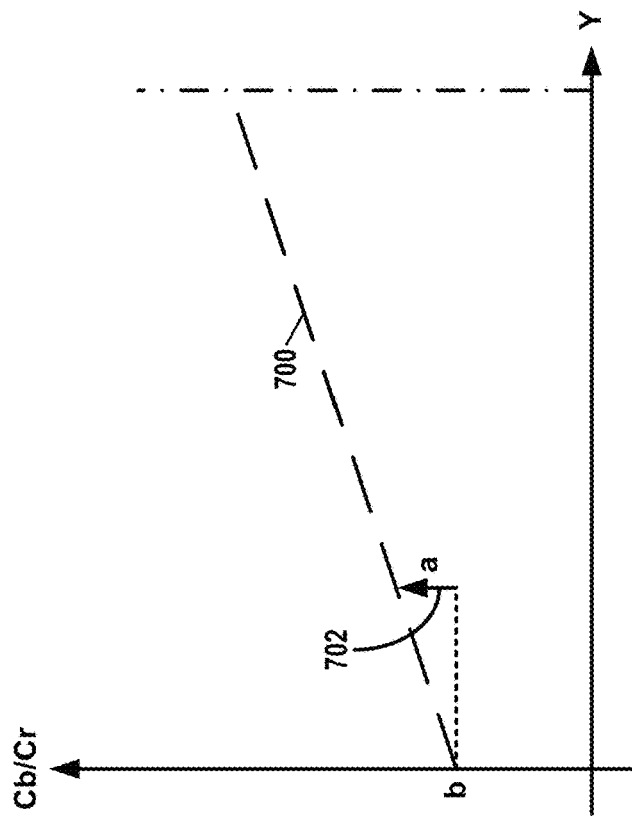
FIG. 7A is a conceptual diagram illustrating a model created with a cross-component linear model.

FIG. 7A is a conceptual diagram illustrating a model created with a cross-component linear model. In the example of FIG. 7A, the vertical axis corresponds to chroma values (e.g., Cb or Cr) and the horizontal axis corresponds to luma values. Line 700 illustrates a linear relationship between luma values and their collocated chroma values. Point "b" indicates the intercept between the vertical axis and line 700. Line 702 indicates a vertical change value "a" in line 700 at a given position along the horizontal axis. The vertical change value "a" may therefore be used to determine the slope of line 700.

FIG. 7B is a conceptual diagram illustrating an effect of a slope adjustment parameter with a model created with a model proposed in JVET-Z0049. The example of FIG. 7B, line 700 is the same as line 700 in FIG. 7A and illustrates a linear relationship between luma values and their collocated chroma values. Delta values, u, are an integer between −4 and 4, inclusive, and signaled in the bitstream. A slope adjustment flag is signaled to indicate whether to apply the delta value to the slope if one of LM mode and MMLM mode is used. In the example of FIG. 7B, a delta value u (indicated by line 704) changes the slope of line 700, resulting in line 706 which has a vertical rise of a'=a+u, for the same distance along the horizontal axis as a in FIG. 7B.

In ECM-5.0, if a non-CCLM mode is selected, a chroma fusion flag as proposed in JVET-Z0051 is signaled to indicate whether the predictors of a non-CCLM mode is fused with the predictors of MMLM mode or not. The phrase "fusion of predictors" may apply to the generation of a predictor (e.g., a prediction block) based on predictors generated using two or more intra prediction modes (e.g., a non-LM mode, an MMLM mode, etc.).

Figure 8:
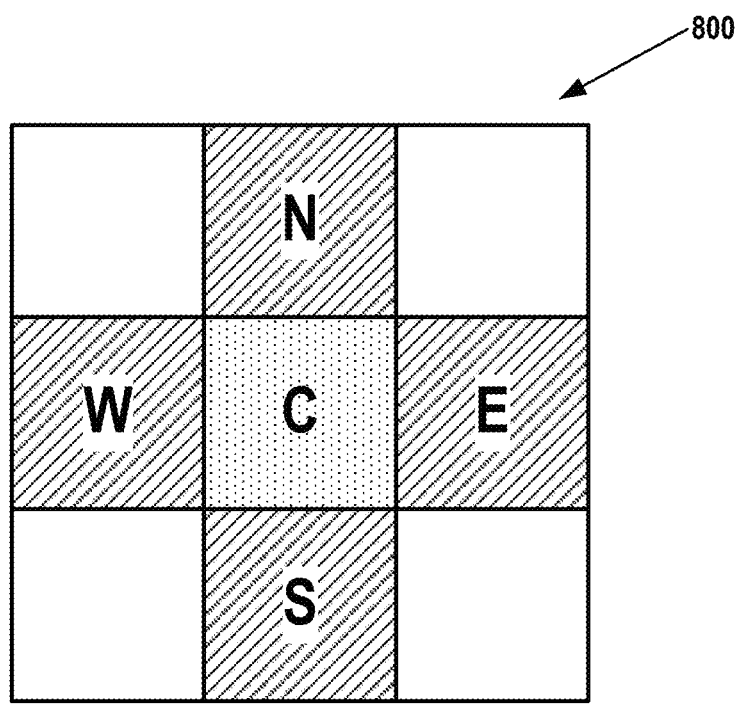
FIG. 8 is a conceptual diagram illustrating a spatial part of a convolutional filter.

A convolutional cross-component model (CCCM) mode has previously been proposed to use a 7-tap filter to predict chroma samples from reconstructed luma samples in a similar spirit as done by the current CCLM modes. As with CCLM, the reconstructed luma samples are down-sampled to match the lower resolution chroma grid when chroma sub-sampling is used. Also, similarly to CCLM, there is an option of using a single model or multi-model variant of CCCM. FIG. 8 is a conceptual diagram illustrating a spatial part 800 of a convolutional filter. The inputs to the 7-tap filter are listed below:

A center (C) luma sample which is collocated with the chroma sample to be predicted Above/north (N), below/south (S), left/west (W) and right/east (E) neighbors of the center luma sample as illustrated in FIG. 8.

A nonlinear term P is represented as power of two of the center luma sample C and scaled to the sample value range of the content, i.e., P=(C*C+midVal)>>bitDepth. That is, for 10-bit content it is calculated as: P=(C*C+512)>>10.

The bias term B represents a scalar offset between the input and output (similarly to the offset term in CCLM) and is set to middle chroma value (512 for 10-bit content).

The output of the filter is calculated as a convolution between the filter coefficients $c_i$ and the input values and clipped to the range of valid chroma samples:

$$\text{predChromaVal}=c_0C+c_1N+c_2S+c_3E+c_4W+c_5P+c_6B$$

A CCCM unit (e.g., CCCM unit 228 of video encoder 200 or CCCM unit 322 of video decoder 300) may determine the coefficients ($c_0$, $c_1$, $c_2$, $c_3$, $c_4$, $c_5$, and $c_6$) using regression based on mean-squared error (MSE) minimization on reference samples of a current block (e.g., a current CU or current PU). In some examples, the CCCM unit may perform the MSE minimization by calculating an autocorrelation matrix for the luma input and a cross-correlation vector between the luma input and chroma output. The CCCM unit may perform LDL decomposition on the autocorrelation matrix and may calculate the final filter coefficients using back-substitution.

When the LM flag is true, a CCCM flag may be further signaled to indicate whether it is single-model CCCM mode or a regular LM mode. When the MMLM flag is true, a CCCM flag is further signaled to indicate whether it is multi-model CCCM mode or MMLM mode. When CCCM flag is true, the slope adjustment flag is not signaled, and is inferred to be false (disabled) at decoder side.

As mentioned above, the CCCM unit may determine the coefficients to use in the 7-tap filter based on reference samples. Conventionally there is only one set of reference samples available for use to determine the coefficients. However, the ability to select among different patterns (i.e., templates) of reference samples may yield better results for predicting chroma samples. For example, if the current CU has a chroma gradient from left to right, the filter may yield better predictions of chroma samples of the current CU if the coefficients were determined based on the samples left of the current CU than the samples above the current CU. Similarly, if the current CU has a chroma gradient from top to bottom, the filter may yield better predictions of chroma samples of the current CU if the coefficients were determined based on the samples above the current CU than the samples left of the current CU. In still other examples, the filter may yield better predictions of chroma samples of the current CU if the coefficients were determined based on at least some reference samples above the current CU and at least some reference samples left of the current CU. However, not all sets of reference samples may be available.

This disclosure proposes a scheme in which the template to use in the current CU by a coding tool, such as CCCM mode, may be selected from among a plurality of templates. The template may be one of (but not limited to) the templates described below.

Figure 9:
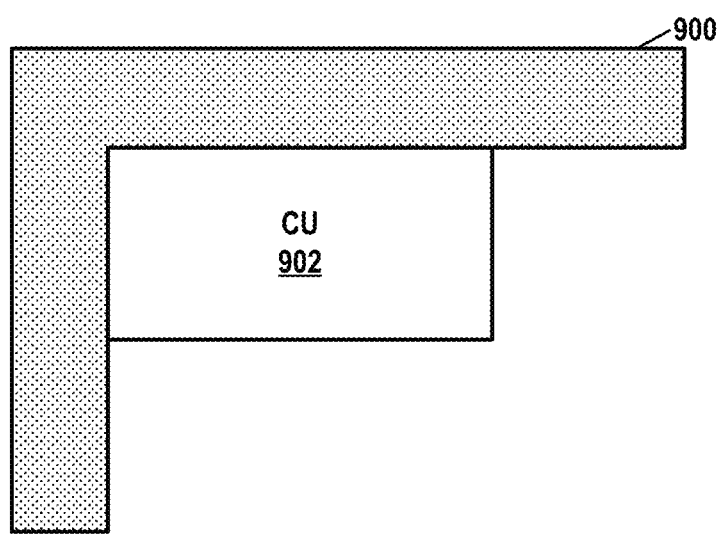
FIG. 9 is a conceptual diagram illustrating a full template used by a current coding unit (CU) according to techniques of this disclosure.

A full template: the neighbouring samples from below-left to top-right as shown in FIG. 9. In other words, FIG. 9 is a conceptual diagram illustrating a full template 900 used by a current CU 902 according to techniques of this disclosure.

Figure 10A:
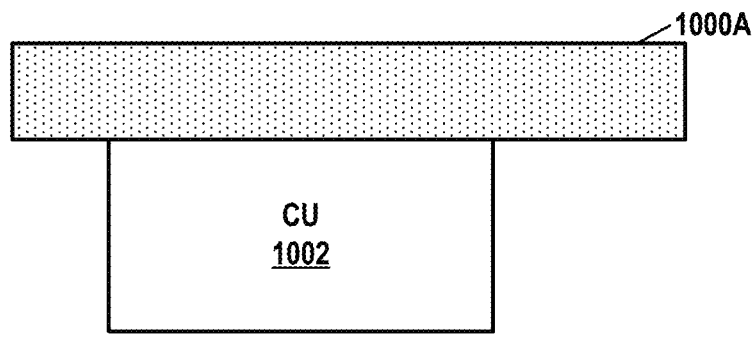
FIG. 10A is a conceptual diagram illustrating a top template used by a current CU that includes top-left samples according to techniques of this disclosure.
Figure 10B:
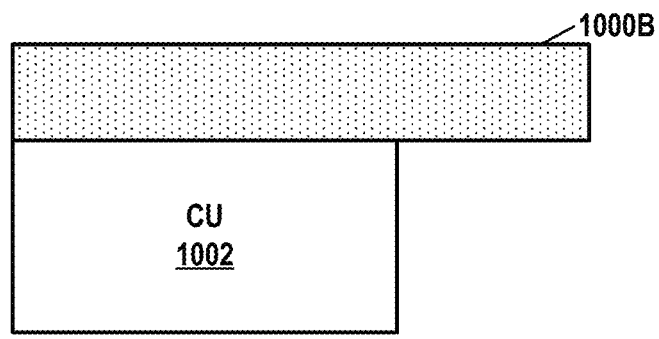
FIG. 10B is a conceptual diagram illustrating a top template used by a current CU that excludes top-left samples according to techniques of this disclosure.

A top template limited to top neighboring samples as shown in FIG. 10A and FIG. 10B. Specifically, FIG. 10A is a conceptual diagram illustrating a top template 1000A used by a current CU 1002 that includes top-left samples according to techniques of this disclosure. FIG. 10B is a conceptual diagram illustrating a top template 1000B used by current CU 1002 that excludes top-left samples according to techniques of this disclosure.

Figure 11A:
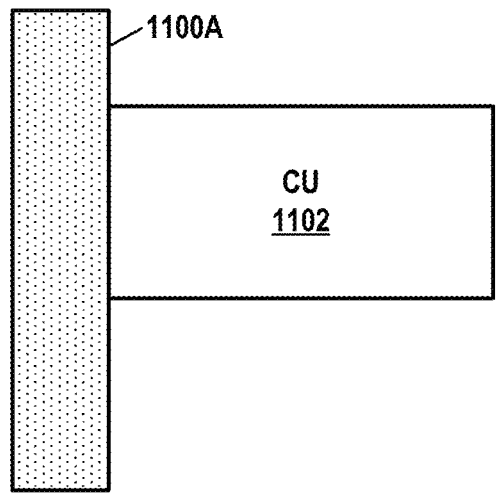
FIG. 11A is a conceptual diagram illustrating a left template used by a current CU that includes top-left samples according to techniques of this disclosure.
Figure 11B:
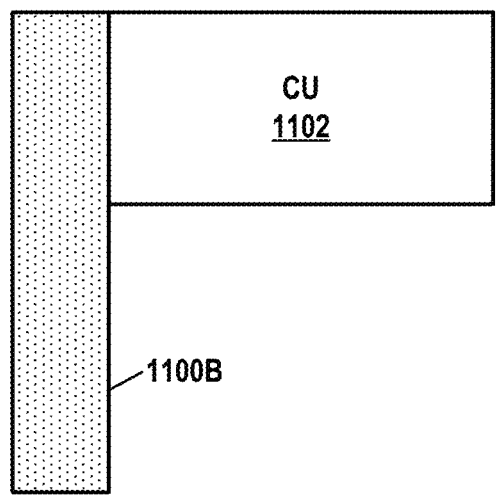
FIG. 11B is a conceptual diagram illustrating a left template used by a current CU that excludes top-left samples according to techniques of this disclosure.

A left template that is limited to left neighbouring samples as shown in FIG. 11A and FIG. 11B. FIG. 11A is a conceptual diagram illustrating a left template 1100A used by a current CU 1102 that includes top-left samples according to techniques of this disclosure. FIG. 11B is a conceptual diagram illustrating a left template 1100B used by current CU 1102 that excludes top-left samples according to techniques of this disclosure.

Figure 12A:
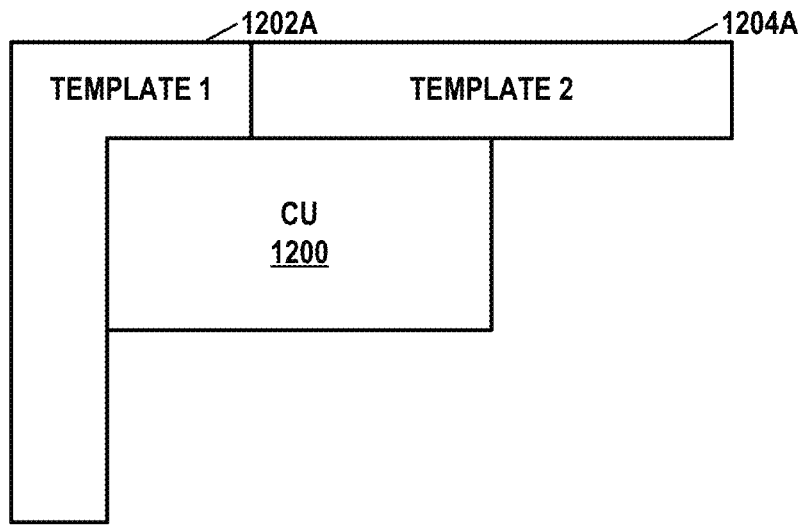
FIGS. 12A and 12B are conceptual diagrams illustrating templates split from a full template according to techniques of this disclosure.
Figure 12B:
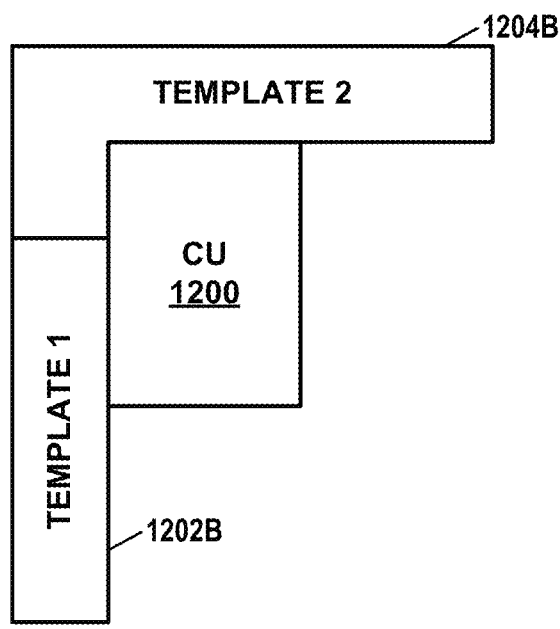

In another example of this disclosure, templates are derived from the full template by splitting full template into N equal templates geometrically. In one example N is 2, and full template can be split into two templates 1202A, 1204A for CU 1200 as shown in FIG. 12A and templates 1202B, 1204B for CU 1200 in FIG. 12B. FIGS. 12A and 12B are conceptual diagrams illustrating templates split from a full template according to techniques of this disclosure. Thus, in FIGS. 12A and 12B, a first template (e.g., template 1202A or 1204B) and a second template (e.g., template 1204A or 1202B) do not overlap. The first template includes samples above and left of the current CU. The second template includes samples either above or left of the current CU.

Figure 13A:
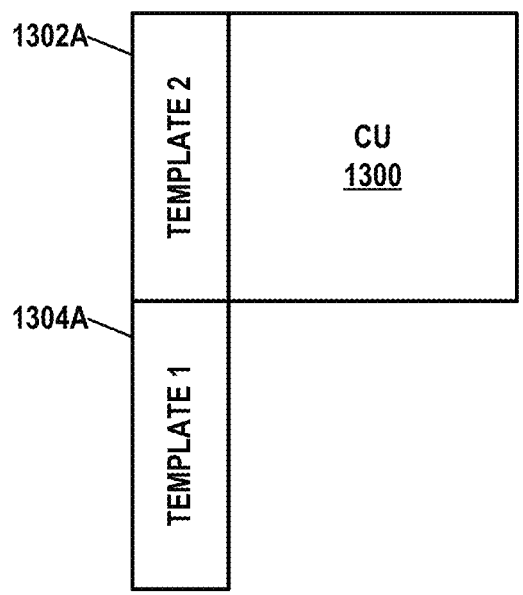
FIGS. 13A and 13B are conceptual diagrams illustrating templates on the same side according to techniques of this disclosure.
Figure 13B:
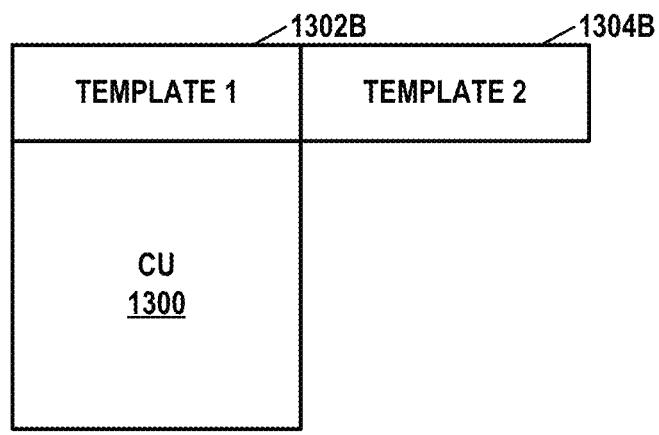

At picture boundaries, the full template may be equal to either the Top template or the Left template. In this case, the split templates are all on the same side. FIG. 13A and FIG. 13B illustrates this case if N is 2. FIGS. 13A and 13B are conceptual diagrams illustrating templates on the same side according to techniques of this disclosure. Specifically, FIG. 13A shows two or more templates (1302A, 1304A) that are limited to neighboring reconstructed samples left of a current CU 1300. FIG. 13B shows two or more templates (1302B, 1304B) that are limited to neighboring reconstructed samples above the current CU 1300.

In another example, template derivation can be applied to Top template (1000A, 1000B) in FIGS. 10A and 10B and Left template (1100A, 1100B) in FIGS. 11A and 11B.

The numbers of reference samples in Full template, Template1, and Template2 are, respectively, denoted as nSample_F, nSample_1, and nSample_2, where Template1 and Template2 may be the derived templates split from Full template, and in another example Template1 is Top template, and Template2 is Left template. The following constraints are proposed to infer which template is used:

If nSample_F<threshold1, full template is disallowed to be used in current CU.

If nSample_1<threshold2, Template1 is disallowed to be used in current CU.

If nSample_2<threshold2, Template2 is disallowed to be used in current CU.

Note that threshold1 and threshold2 are pre-assigned positive integers. In one example threshold1=threshold2, and in another one example threshold1<threshold2. In another one example, threshold1 and threshold2 depends on the mode index. For example, if mode index indicates it is single-model linear model mode, threshold1 and threshold2 are set to be threshold1_s and threshold2_s. Instead, if mode index indicates it is multi-model linear model mode, threshold1 and threshold2 are set to be threshold1_m and threshold2_m. In one example, threshold1_s and threshold1_m are the same. In another example, threshold1_s and threshold1_m are different, and threshold1_s<threshold1_m. Same comparison relationship can be applied to threshold2_s and threshold2_m.

In this way, the video coder (e.g., CCCM unit 228 of video encoder 200 or CCCM unit 322 of video decoder 300) may disallow from selection one or more templates in a plurality of templates based on a comparison of a quantity of samples in the templates and thresholds for the plurality of templates. For instance, the video coder may disallow a first template (e.g., the full template that includes neighboring reconstructed samples above and left of the current CU) based on a quantity of samples in the first template (nSample_F) being less than a first threshold (threshold1). The video coder may disallow a second template (e.g., Template1, which is limited to neighboring reconstructed samples above the current CU) based on a quantity of samples in the second template (nSample_1) being less than a second threshold (threshold2). The video coder may disallow a third template (e.g., Template2, which is limited to neighboring reconstructed samples left of the current CU) based on a quantity of samples in the third template (nSample_2) being less than the second threshold (threshold2).

The video coder may encode or decode a mode index that indicates the selected template. In some examples, the video coder may encode or decode a mode index that indicates which template of a plurality of templates is used for the current CU and how many linear models are used for the current CU. For instance, if the template selection scheme is applied to CCCM, the following signaling may be applied:

A mode index is first signaled to indicate which template is used and how many linear models is used (example: index 0 is single model with full template, index 1 is multi-model with full template, index 2 is single model with Template1, index 3 is single model with Template2, index 4 is multi-model with Template1, and index 5 is multi-model with Template2). A CCCM flag is signaled to indicate if regular linear model is used (CCCM flag is 0) or the CCCM is used (CCCM flag is 1). If mode index indicates multi-model with Template1 is used, and nSample_1<threshold2_m, CCCM flag is inferred to be 0. If mode index indicates multi-model with Template2 is used, and nSample_2<threshold2_m, CCCM flag is inferred to be 0. If mode index indicates single-model with Template1 is used, and nSample_1<threshold2_s, CCCM flag is inferred to be 0. If mode index indicates single-model with Template2 is used, and nSample_2<threshold2_s, CCCM flag is inferred to be 0.

Thus, the video coder may determine, based on a comparison of a threshold (e.g., threshold1, threshold2, threshold2_s, threshold2_m) and a quantity of reference samples in a selected template, whether the selected template is allowed. A mode index may indicates which template from among a plurality of templates (e.g., full template, Template1, or Template2) is the selected template. As noted above, each of the templates includes a different set of reconstructed samples that neighbor a current CU. Based on determining that the selected template is allowed and that a CCCM mode is to be used, the video coder may apply the CCCM mode to predict chroma samples of the current CU based on reconstructed luma samples of the current CU and the reference samples in the selected template. If the selected template is not allowed (e.g., because nSample_F<threshold1, nSample_1<threshold2, or nSample_2<threshold2, nSample_1<threshold2_m, nSample_2<threshold2_m, or nSample_2<threshold2_s), the CCCM flag is inferred to be 0, so the CCCM mode is not used.

A chroma fusion scheme is now described. This disclosure proposes replacing the fusion of the predictors of a non-CCLM mode and the predictors of MMLM mode with the fusion of the predictors of a non-CCLM mode and the predictors of multi-model CCCM mode. If nSample_F<threshold1_m, signaling of the chroma fusion flag is bypassed, and is inferred to be 0 at decoder side. In another one example, the predictors of a non-CCLM mode are fused with one of linear model modes based on the condition of nSample_F>threshold1_m. One example is the predictors of a non-CCLM mode is fused with the predictors of single-model CCCM mode if nSample_F<threshold1_m, and the predictors of a non-CCLM mode is fused with the predictors of multi-model CCCM mode if nSample_F>threshold1_m.

It is further proposed to bypass the signaling of the chroma fusion flag if the length of above and left CU boundaries (indicated as length_b, where length_b=CU_width+CU_height, CU_width is the width of CU, CU_height is the height of CU) is smaller than or equal to a threshold (indicated as threshold_f), i.e., length_b<threshold_f. The condition of length_b<threshold_f can be combined with one or at least two of conditions mentioned above. One example is the signaling of the chroma fusion flag is bypassed if length_b<threshold_f and nSample_F<threshold1_m.

Figure 14:
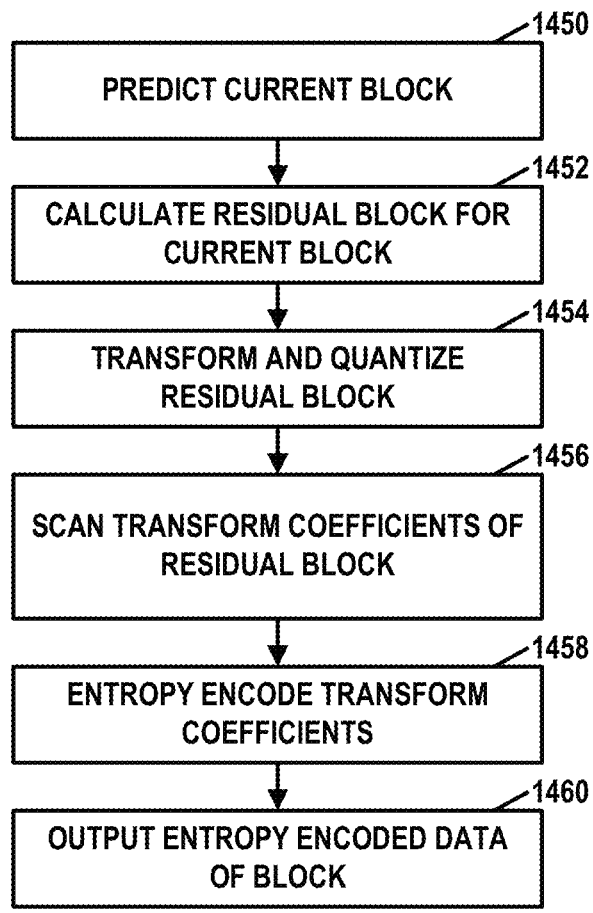
FIG. 14 is a flowchart illustrating an example method for encoding a current block in accordance with the techniques of this disclosure.

FIG. 14 is a flowchart illustrating an example method for encoding a current block in accordance with the techniques of this disclosure. The current block may comprise a current CU. Although described with respect to video encoder 200 (FIGS. 1 and 2), it should be understood that other devices may be configured to perform a method similar to that of FIG. 14.

In this example, video encoder 200 initially predicts the current block (1450). For example, video encoder 200 may form a prediction block for the current block. In accordance with the techniques of this disclosure, video encoder 200 may, as part of forming the prediction block, determine, based on a comparison of a threshold and a quantity of reference samples in a selected template, whether the selected template is allowed, wherein a mode index indicates which template from among a plurality of templates is the selected template. Based on determining that the selected template is allowed and that a CCCM mode is to be used, video decoder 300 may apply the CCCM mode to predict chroma samples of the current block based on reconstructed luma samples of the current block and the reference samples in the selected template.

Video encoder 200 may then calculate a residual block for the current block (1452). To calculate the residual block, video encoder 200 may calculate a difference between the original, unencoded block and the prediction block for the current block. Video encoder 200 may then transform the residual block and quantize transform coefficients of the residual block (1454). Next, video encoder 200 may scan the quantized transform coefficients of the residual block (1456). During the scan, or following the scan, video encoder 200 may entropy encode the transform coefficients (1458). For example, video encoder 200 may encode the transform coefficients using CAVLC or CABAC. Video encoder 200 may then output the entropy encoded data of the block (1460).

Figure 15:
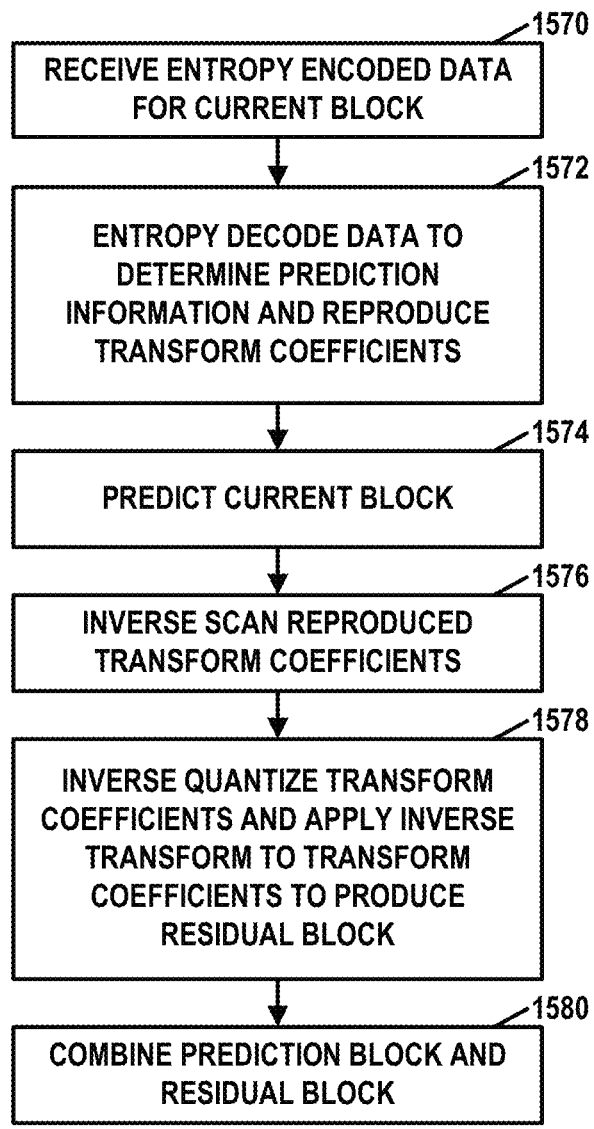
FIG. 15 is a flowchart illustrating an example method for decoding a current block in accordance with the techniques of this disclosure.

FIG. 15 is a flowchart illustrating an example method for decoding a current block of video data in accordance with the techniques of this disclosure. The current block may comprise a current CU. Although described with respect to video decoder 300 (FIGS. 1 and 3), it should be understood that other devices may be configured to perform a method similar to that of FIG. 15.

Video decoder 300 may receive entropy encoded data for the current block, such as entropy encoded prediction information and entropy encoded data for transform coefficients of a residual block corresponding to the current block (1570). Video decoder 300 may entropy decode the entropy encoded data to determine prediction information for the current block and to reproduce transform coefficients of the residual block (1572). Video decoder 300 may predict the current block (1574), e.g., using an intra- or inter-prediction mode as indicated by the prediction information for the current block, to calculate a prediction block for the current block. In accordance with the techniques of this disclosure, video decoder 300 may determine, as part of calculating the prediction block, determine, based on a comparison of a threshold and a quantity of reference samples in a selected template, whether the selected template is allowed, wherein a mode index indicates which template from among a plurality of templates is the selected template. Based on determining that the selected template is allowed and that a CCCM mode is to be used, video decoder 300 may apply the CCCM mode to predict chroma samples of the current block based on reconstructed luma samples of the current block and the reference samples in the selected template.

Video decoder 300 may then inverse scan the reproduced transform coefficients (1576), to create a block of quantized transform coefficients. Video decoder 300 may then inverse quantize the transform coefficients and apply an inverse transform to the transform coefficients to produce a residual block (1578). Video decoder 300 may ultimately decode the current block by combining the prediction block and the residual block (1580).

Figure 16:
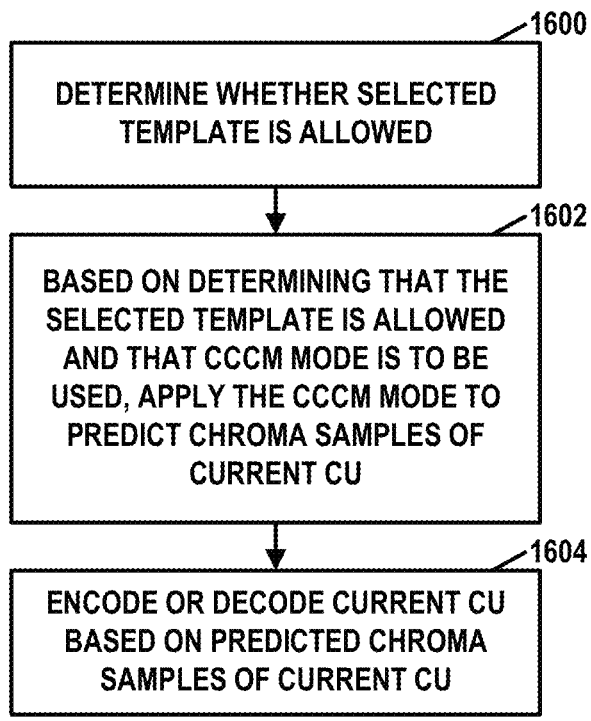
FIG. 16 is a flowchart illustrating an example method for encoding or decoding video data according to techniques of this disclosure.

FIG. 16 is a flowchart illustrating an example method for encoding or decoding video data according to techniques of this disclosure. In the example of FIG. 16, a CCCM unit (e.g., CCCM unit 228 of video encoder 200 or CCCM unit 322 of video decoder 300) may determine, based on a comparison of a threshold and a quantity of reference samples in a selected template, whether the selected template is allowed (1600). A mode index may indicate which template from among a plurality of templates is the selected template. Each of the templates includes a different set of reconstructed samples that neighbor a current CU of a current picture of the video data.

For example, the plurality of templates may include a first template that includes neighboring reconstructed samples above and left of the current CU, a second template that is limited to neighboring reconstructed samples above the current CU, and a third template that is limited to neighboring reconstructed samples left of the current CU. The CCCM unit may disallow the first template based on a quantity of samples in the first template being less than a first threshold. The CCCM unit may disallow the second template based on a quantity of samples in the second template being less than a second threshold. The CCCM unit may disallow the third template based on a quantity of samples in the third template being less than the second threshold. In some examples, the first threshold is equal to the second threshold. In other examples, the first threshold is less than the second threshold. In some examples, at least one of the first threshold or second threshold depends on a mode index.

In some examples, the plurality of templates includes two or more templates that are limited to neighboring reconstructed samples above the current CU (e.g., as shown in the example of FIG. 13B) or two or more templates that are limited to neighboring reconstructed samples left of the current CU (e.g., as shown in the example of FIG. 13A). In some examples, such as the examples of FIG. 12A and FIG. 12B, the plurality of templates includes a first template and a second template that do not overlap, the first template includes samples above and left of the current CU, and the second template includes samples either above or left of the current CU. In some examples, the video coder may encode or decode a mode index that indicates which template of the plurality of templates is used for the current CU and how many linear models are used for the current CU, e.g., as described above.

Furthermore, in the example of FIG. 16, the CCCM unit may apply a CCCM mode to predict chroma samples of the current CU based on reconstructed luma samples of the current CU and the reference samples in the selected template (1602). For instance, the CCCM unit may downsample the reconstructed luma samples of the current CU and apply a 7-tap filter to luma samples of the down-sampled luma block to predict the chroma samples of the current CU. The 7-tap filter uses center, left, right, above, and below luma samples of the down-sampled luma block, as well as a bias term and a nonlinear term represented as power of two of the center luma sample C and scaled to the sample value range of the content. The CCCM unit may determine coefficients of the 7-tap filter based on the reference samples in the selected template.

A video coder that includes the CCCM unit (e.g., video encoder 200 or video decoder 300) may encode or decode the current CU based on the predicted chroma samples for the current CU (1604). For example, residual generation unit 204 of video encoder 200 may generate residual data based on the predicted chroma samples for the current CU and original chroma samples of the current CU. In this example, transform processing unit 206 of video encoder 200 may apply a transform to the residual data to generate a transform block. Quantization unit 208 of video encoder 200 may quantize transform coefficients of the transform block. Entropy encoding unit 220 of video encoder 200 may apply entropy encoding to the quantized transform coefficients. In an example where the video coder is video decoder 300, reconstruction unit 310 may reconstruct chroma samples of the current CU based on the predicted chroma samples for the current CU and reconstructed residual data.

The following is a non-limiting list of clauses according to techniques of this disclosure.

Clause 1A: A method of coding video data includes selecting a template that includes neighboring reconstructed samples of a current coding unit (CU) of a current picture of the video data; applying a coding tool that uses the selected template to perform intra prediction to generate a predictor for the current CU; and encoding or decoding the current CU based on the predictor for the current CU.

Clause 2A: The method of clause 1A, wherein selecting the template comprises selecting the template from among a plurality of templates that includes two or more of: a first template that includes neighboring reconstructed samples above and left of the current CU, a second template that is limited to neighboring reconstructed samples above the current CU, and a third template that is limited to neighboring reconstructed samples left of the current CU.

Clause 3A: The method of clause 1A, wherein selecting the template comprises, based on the current CU being at an edge of the current picture, selecting the template from among a plurality of templates that includes either: two or more templates that are limited to neighboring reconstructed samples above the current CU, or two or more templates that are limited to neighboring reconstructed samples left of the current CU.

Clause 4A: The method of any of clauses 1A-3A, wherein selecting the template comprises disallowing one or more templates in a plurality of templates based on a comparison of the quantity of samples in the templates and threshold for the plurality of templates.

Clause 5A: The method of any of clauses 1A-4A, wherein: a first template includes neighboring reconstructed samples above and left of the current CU, a second template is limited to neighboring reconstructed samples above the current CU, a third template is limited to neighboring reconstructed samples left of the current CU, and selecting the template comprises: disallowing the first template based on the quantity of samples in the first template being less than a first threshold; disallowing the second template based on the quantity of samples in the second template being less than a second threshold; and disallowing the third template based on the quantity of samples in the third template being less than the second threshold.

Clause 6A: The method of clause 5A, wherein one of: the first threshold is equal to the second threshold, or the first threshold is less than the second threshold.

Clause 7A: The method of any of clauses 5A-6A, wherein at least one of the first threshold or second threshold depends on a mode index.

Clause 8A: The method of any of clauses 1A-6A, wherein the coding tool is one of: convolutional cross-component model (CCCM) for intra prediction, cross-component linear model with slope adjustment, or chroma fusion.

Clause 9A: The method of any of clauses 1A-8A, wherein: the coding tool is CCCM for intra prediction, and encoding or decoding a mode index that indicates which template of a plurality of templates is used for the current CU and how many linear models are used for the current CU.

Clause 10A: The method of any of clauses 1A-9A, wherein: the predictor is a first predictor, the coding tool is a first coding tool, the first coding tool is a multi-model CCCM mode, a first template includes neighboring reconstructed samples above and left of the current CU, the method further comprises: based on the quantity of samples in the first template not being less than a threshold, determining that a chroma fusion flag is signaled in a bitstream that includes an encoded representation of the video data; applying a second coding tool to perform intra prediction to generate a second predictor for the current CU, wherein the second coding tool is a non-cross-component linear model mode, and encoding or decoding the current CU comprises encoding or decoding the current CU based on the first and second predictors for the current CU.

Clause 11A. The method of any of clauses 1A-9A, wherein the method further comprises, based at least in part on a length of an above boundary and a left boundary of the current CU being smaller than or equal to a threshold, determining that a chroma fusion flag is bypassed in a bitstream that includes an encoded representation of the video data, wherein the chroma fusion flag indicates whether predictors of a non-Cross Component Linear Model (non-CCLM) model are fused with predictors of a multi-model CCCM mode.

Clause 12A: A device for coding video data, the device comprising one or more means for performing the method of any of clauses 1A-11A.

Clause 13A: The device of clause 12A, wherein the one or more means comprise one or more processors implemented in circuitry.

Clause 14A: The device of any of clauses 12A and 14A, further comprising a memory to store the video data.

Clause 15A: The device of any of clauses 12A-14A, further comprising a display configured to display decoded video data.

Clause 16A: The device of any of clauses 12A-15A, wherein the device comprises one or more of a camera, a computer, a mobile device, a broadcast receiver device, or a set-top box.

Clause 17A: The device of any of clauses 12A-16A, wherein the device comprises a video decoder.

Clause 18A: The device of any of clauses 12A-17A, wherein the device comprises a video encoder.

Clause 19A: A computer-readable storage medium having stored thereon instructions that, when executed, cause one or more processors to perform the method of any of clauses 1A-11A.

Clause 1B. A method of coding video data, the method comprising: determining a selected template from among a plurality of templates each of which includes reconstructed samples that neighbor a current coding unit (CU) of a current picture of the video data, wherein determining the selected template comprises disallowing from selection one or more templates in the plurality of templates based on a comparison of a quantity of samples in the templates and thresholds for the plurality of templates; applying a coding tool that uses the selected template to perform intra prediction to generate a predictor for the current CU, wherein the coding tool is convolutional cross-component model (CCCM) for intra prediction; and encoding or decoding the current CU based on the predictor for the current CU.

Clause 2B. The method of clause 1B, wherein the plurality of templates includes: a first template that includes neighboring reconstructed samples above and left of the current CU, a second template that is limited to neighboring reconstructed samples above the current CU, and a third template that is limited to neighboring reconstructed samples left of the current CU.

Clause 3B. The method of clause 2B, wherein disallowing the one or more templates comprises: disallowing the first template based on a quantity of samples in the first template being less than a first threshold; disallowing the second template based on a quantity of samples in the second template being less than a second threshold; and disallowing the third template based on a quantity of samples in the third template being less than the second threshold.

Clause 4B. The method of clause 3B, wherein one of: the first threshold is equal to the second threshold, or the first threshold is less than the second threshold.

Clause 5B. The method of any of clauses 3B-4B, wherein at least one of the first threshold or second threshold depends on a mode index.

Clause 6B. The method of any of clauses 1B-5B, wherein, based on the current CU being at an edge of the current picture, the plurality of templates includes either: two or more templates that are limited to neighboring reconstructed samples above the current CU, or two or more templates that are limited to neighboring reconstructed samples left of the current CU.

Clause 7B. The method of any of clauses 1B-6B, wherein: the plurality of templates includes a first template and a second template that do not overlap, the first template includes samples above and left of the current CU, and the second template includes samples either above or left of the current CU.

Clause 8B. The method of any of clauses 1A-7B, wherein the method further comprises encoding or decoding a mode index that indicates which template of the plurality of templates is used for the current CU and how many linear models are used for the current CU.

Clause 9B. The method of any of clauses 1B-8B, wherein applying the coding tool comprises: determining coefficients of a filter based on reference samples in the selected template; down-sampling a reconstructed luma block of the current CU to generate a down-sampled luma block; and applying a 7-tap filter to luma samples of the down-sampled luma block to predict chroma samples of the current CU.

Clause 10B. A device for encoding or decoding video data, the device comprising: a memory configured to store the video data; one or more processors implemented in circuitry, the one or more processors configured to: determine a select template from among a plurality of templates each of which includes reconstructed samples that neighbor a current coding unit (CU) of a current picture of the video data, wherein determining the selected template comprises disallowing from selection one or more templates in the plurality of templates based on a comparison of a quantity of samples in the templates and thresholds for the plurality of templates; apply a coding tool that uses the selected template to perform intra prediction to generate a predictor for the current CU, wherein the coding tool is convolutional cross-component model (CCCM) for intra prediction; and encode or decode the current CU based on the predictor for the current CU.

Clause 11B. The device of clause 10B, wherein the plurality of templates includes: a first template that includes neighboring reconstructed samples above and left of the current CU, a second template that is limited to neighboring reconstructed samples above the current CU, and a third template that is limited to neighboring reconstructed samples left of the current CU.

Clause 12B. The device of clause 11B, wherein the one or more processors are configured to, as part of disallowing the one or more templates: disallow the first template based on a quantity of samples in the first template being less than a first threshold; disallow the second template based on a quantity of samples in the second template being less than a second threshold; and disallow the third template based on a quantity of samples in the third template being less than the second threshold.

Clause 13B. The device of clause 12B, wherein one of: the first threshold is equal to the second threshold, or the first threshold is less than the second threshold.

Clause 14B. The device of any of clauses 12B-13B, wherein at least one of the first threshold or second threshold depends on a mode index.

Clause 15B. The device of any of clauses 10B-14B, wherein, based on the current CU being at an edge of the current picture, the plurality of templates includes either:

two or more templates that are limited to neighboring reconstructed samples above the current CU, or two or more templates that are limited to neighboring reconstructed samples left of the current CU.

Clause 16B. The device of any of clauses 10B-16B, wherein: the plurality of templates includes a first template and a second template that do not overlap, the first template includes samples above and left of the current CU, and the second template includes samples either above or left of the current CU.

Clause 17B. The device of any of clauses 10B-16B, wherein the one or more processors are further configured to encode or decode a mode index that indicates which template of the plurality of templates is used for the current CU and how many linear models are used for the current CU.

Clause 18B. The device of any of clauses 10B-17B, wherein the one or more processors are configured to, as part of applying the coding tool: determine coefficients of a filter based on reference samples in the selected template; down-sample a reconstructed luma block of the current CU to generate a down-sampled luma block; and apply a 7-tap filter to luma samples of the down-sampled luma block to predict chroma samples of the current CU.

Clause 19B. The device of any of clauses 10B-18B, further comprising a display configured to display decoded video data.

Clause 20B. The device of any of clauses 10B-19B, wherein the device comprises one or more of a camera, a computer, a mobile device, a broadcast receiver device, or a set-top box.

Clause 21B. The device of any of clauses 10B-20B, wherein the device comprises a video decoder.

Clause 22B. The device of any of clauses 10B-21B, wherein the device comprises a video encoder.

Clause 23B. A non-transitory computer-readable storage medium having stored thereon instructions that, when executed, cause one or more processors to: determine a selected template from among a plurality of templates each of which includes reconstructed samples that neighbor a current coding unit (CU) of a current picture of video data, wherein determining the selected template comprises disallowing from selection one or more templates in the plurality of templates based on a comparison of a quantity of samples in the templates and thresholds for the plurality of templates; apply a coding tool that uses the selected template to perform intra prediction to generate a predictor for the current CU, wherein the coding tool is convolutional cross-component model (CCCM) for intra prediction; and encode or decode the current CU based on the predictor for the current CU.

Clause 24B. A device for encoding or decoding video data, the device comprising: means for determining a selected template from among a plurality of templates each of which includes reconstructed samples that neighbor a current coding unit (CU) of a current picture of the video data, wherein the means for determining the selected template comprises means for disallowing from selection one or more templates in the plurality of templates based on a comparison of a quantity of samples in the templates and thresholds for the plurality of templates; means for applying a coding tool that uses the selected template to perform intra prediction to generate a predictor for the current CU, wherein the coding tool is convolutional cross-component model (CCCM) for intra prediction; and means for encoding or decoding the current CU based on the predictor for the current CU.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more DSPs, general purpose microprocessors, ASICs, FPGAs, or other equivalent integrated or discrete logic circuitry. Accordingly, the terms "processor" and "processing circuitry," as used herein may refer to any of the foregoing structures or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

What is claimed is:

1. A method of coding video data, the method comprising: determining, based on a comparison of a threshold and a quantity of reference samples in a selected template, whether the selected template is allowed, wherein a mode index indicates which template from among a plurality of templates is the selected template, wherein each of the templates includes a different set of reconstructed samples that neighbor a current coding unit (CU) of a current picture of the video data, and wherein the plurality of templates includes two or more of:
    a first template that includes neighboring reconstructed samples above and left of the current CU,
    a second template that is limited to neighboring reconstructed samples above the current CU, or
    a third template that is limited to neighboring reconstructed samples left of the current CU;
    and wherein the threshold is one of a first threshold or a second threshold, and determining whether the selected template is allowed comprises:
    disallowing the first template based on a quantity of samples in the first template being less than the first threshold;
    disallowing the second template based on a quantity of samples in the second template being less than the second threshold; and
    disallowing the third template based on a quantity of samples in the third template being less than the second threshold;
    based on determining that the selected template is allowed and that a convolutional cross-component model (CCCM) mode is to be used, applying the CCCM mode to predict chroma samples of the current CU based on reconstructed luma samples of the current CU and the reference samples in the selected template; and
    encoding or decoding the current CU based on the predicted chroma samples of the current CU.

2. The method of claim 1, wherein one of:
    the first threshold is equal to the second threshold, or
    the first threshold is less than the second threshold.

3. The method of claim 1, wherein at least one of the first threshold or second threshold depends on the mode index.

4. The method of claim 1, wherein, based on the current CU being at an edge of the current picture, the plurality of templates includes either:
    two or more templates that are limited to neighboring reconstructed samples above the current CU, or
    two or more templates that are limited to neighboring reconstructed samples left of the current CU.

5. The method of claim 1, wherein:
    the plurality of templates includes a first template and a second template that do not overlap,
    the first template includes samples above and left of the current CU, and
    the second template includes samples either above or left of the current CU.

6. The method of claim 1, wherein:
    the method further comprises encoding or decoding the mode index, and
    the mode index also indicates how many linear models are used for the current CU.

7. The method of claim 1, wherein applying the CCCM mode comprises:
    determining coefficients of a filter based on the reference samples in the selected template;
    down-sampling the reconstructed luma samples of the current CU to generate a down-sampled luma block; and
    applying a 7-tap filter to luma samples of the down-sampled luma block to predict the chroma samples of the current CU.

8. A device for encoding or decoding video data, the device comprising:
    a memory configured to store the video data; and
    one or more processors implemented in circuitry, the one or more processors configured to:
        determine, based on a comparison of a threshold and a quantity of reference samples in a selected template, whether the select template is allowed, wherein a mode index indicates which template from among a plurality of templates is the selected template, wherein each of the templates includes a different set of reconstructed samples that neighbor a current coding unit (CU) of a current picture of the video data, and wherein the plurality of templates includes two or more of:
        a first template that includes neighboring reconstructed samples above and left of the current CU,
        a second template that is limited to neighboring reconstructed samples above the current CU, or
        a third template that is limited to neighboring reconstructed samples left of the current CU;
        and wherein the threshold is one of a first threshold or a second threshold, and the one or more processors are configured to, as part of determining whether the selected template is allowed:
            disallow the first template based on a quantity of samples in the first template being less than the first threshold;
            disallow the second template based on a quantity of samples in the second template being less than the second threshold; and
            disallow the third template based on a quantity of samples in the third template being less than the second threshold;
        based on determining that the selected template is allowed and that a convolutional cross-component model (CCCM) mode is to be used, apply the CCCM mode to predict chroma samples of the current CU based on reconstructed luma samples of the current CU and the reference samples in the selected template; and
        encode or decode the current CU based on the predicted chroma samples of the current CU.

9. The device of claim 8, wherein one of:
    the first threshold is equal to the second threshold, or
    the first threshold is less than the second threshold.

10. The device of claim 8, wherein at least one of the first threshold or second threshold depends on the mode index.

11. The device of claim 8, wherein, based on the current CU being at an edge of the current picture, the plurality of templates includes either:
  two or more templates that are limited to neighboring reconstructed samples above the current CU, or
  two or more templates that are limited to neighboring reconstructed samples left of the current CU.

12. The device of claim 8, wherein:
  the plurality of templates includes a first template and a second template that do not overlap,
  the first template includes samples above and left of the current CU, and
  the second template includes samples either above or left of the current CU.

13. The device of claim 8, wherein the one or more processors are further configured to encode or decode the mode index and the mode index also indicates how many linear models are used for the current CU.

14. The device of claim 8, wherein the one or more processors are configured to, as part of applying the CCCM mode:
  determine coefficients of a filter based on the reference samples in the selected template;
  down-sample the reconstructed luma samples of the current CU to generate a down-sampled luma block; and
  apply a 7-tap filter to luma samples of the down-sampled luma block to predict the chroma samples of the current CU.

15. The device of claim 8, further comprising a display configured to display decoded video data.

16. The device of claim 8, wherein the device comprises one or more of a camera, a computer, a mobile device, a broadcast receiver device, or a set-top box.

17. The device of claim 8, wherein the device comprises a video decoder.

18. The device of claim 8, wherein the device comprises a video encoder.

19. A non-transitory computer-readable storage medium having stored thereon instructions that, when executed, cause one or more processors to:
  determine, based on a comparison of a threshold and a quantity of reference samples in a selected template, whether the selected template is allowed, wherein a mode index indicates which template from among a plurality of templates is the selected template, wherein each of the templates includes a different set of reconstructed samples that neighbor a current coding unit (CU) of a current picture of video data, and wherein the plurality of templates includes two or more of:
  a first template that includes neighboring reconstructed samples above and left of the current CU,
  a second template that is limited to neighboring reconstructed samples above the current CU, or
  a third template that is limited to neighboring reconstructed samples left of the current CU;
  and wherein the threshold is one of a first threshold or a second threshold, and the instructions further cause the one or more processors to, as part of determining whether the selected template is allowed:
    disallow the first template based on a quantity of samples in the first template being less than the first threshold;
    disallow the second template based on a quantity of samples in the second template being less than the second threshold; and
    disallow the third template based on a quantity of samples in the third template being less than the second threshold;
  based on determining that the selected template is allowed and that a convolutional cross-component model (CCCM) mode is to be used, apply the CCCM mode to predict chroma samples of the current CU based on reconstructed luma samples of the current CU and the reference samples in the selected template; and
  encode or decode the current CU based on the predicted chroma samples of the current CU.

20. A device for encoding or decoding video data, the device comprising:
  means for determining, based on a comparison of a threshold and a quantity of reference samples in a selected template, whether the selected template is allowed, wherein a mode index indicates which template from among a plurality of templates is the selected template, wherein each of the templates includes a different set of reconstructed samples that neighbor a current coding unit (CU) of a current picture of the video data, and wherein the plurality of templates includes two or more of:
  a first template that includes neighboring reconstructed samples above and left of the current CU,
  a second template that is limited to neighboring reconstructed samples above the current CU, or
  a third template that is limited to neighboring reconstructed samples left of the current CU;
  and wherein the threshold is one of a first threshold or a second threshold, and the means for determining whether the selected template is allowed is further configured to:
    disallow the first template based on a quantity of samples in the first template being less than the first threshold;
    disallow the second template based on a quantity of samples in the second template being less than the second threshold; and
  disallow the third template based on a quantity of samples in the third template being less than the second threshold;
  means for applying, based on determining that the selected template is allowed and that a convolutional cross-component model (CCCM) mode is to be used, the CCCM mode to predict chroma samples of the current CU based on reconstructed luma samples of the current CU and the reference samples in the selected template; and
  means for encoding or decoding the current CU based on the predicted chroma samples of the current CU.

* * * * *